US010943381B2

(12) United States Patent
Canberk et al.

(10) Patent No.: US 10,943,381 B2
(45) Date of Patent: *Mar. 9, 2021

(54) CONDITIONAL MODIFICATION OF AUGMENTED REALITY OBJECT

(71) Applicant: Snap Inc., Santa Monica, CA (US)

(72) Inventors: Ilteris Canberk, Marina Del Rey, CA (US); Andrés Monroy-Hernández, Seattle, WA (US); Rajan Vaish, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/947,955

(22) Filed: Aug. 25, 2020

(65) Prior Publication Data

US 2020/0380747 A1 Dec. 3, 2020

Related U.S. Application Data

(63) Continuation of application No. 16/868,315, filed on May 6, 2020, now Pat. No. 10,789,749, which is a (Continued)

(51) Int. Cl.

*G06T 11/60* (2006.01)
*G06T 19/00* (2011.01)
*G06T 11/00* (2006.01)

(52) U.S. Cl.

CPC ............ *G06T 11/60* (2013.01); *G06T 11/001* (2013.01); *G06T 19/006* (2013.01); *G06T 2200/24* (2013.01)

(58) Field of Classification Search

None

See application file for complete search history.

(56) References Cited

U.S. PATENT DOCUMENTS 666,223 A 1/1901 Shedlock
4,581,634 A 4/1986 Williams
(Continued)

FOREIGN PATENT DOCUMENTS

CA 2887596 A1 7/2015
EP 2051480 A1 4/2009
(Continued)

OTHER PUBLICATIONS

"A Whole New Story", Snap, Inc., [Online] Retrieved from the Internet: <URL: https://www.snap.com/en-US/news/>, (2017), 13 pgs.

(Continued)

*Primary Examiner* — David H Chu

(74) *Attorney, Agent, or Firm* — Schwegman Lundberg & Woessner, P.A.

(57) ABSTRACT

A server machine modifies an augmented reality (AR) object in response to fulfillment of a condition. The machine provides, to a user device, object data that defines the AR object. The object data specifies a physical geolocation of the AR object, a presentation attribute of the AR object, a conditional modification program, and a trigger condition for execution of the conditional modification program. The object data causes the user device to present the AR object with a first appearance, located at the physical geolocation. The machine detects fulfillment of the trigger condition, and in response, the machine executes the conditional modification program. This modifies the object data by modifying the presentation attribute. The machine provides, to the user device, the modified object data, which causes the user device to present the AR object with a second appearance based on the modified presentation attribute.

20 Claims, 12 Drawing Sheets

Related U.S. Application Data continuation of application No. 16/043,995, filed on Jul. 24, 2018, now Pat. No. 10,679,393.

(56) References Cited

U.S. PATENT DOCUMENTS

| | | | |
|---|---|---|---|
| 4,975,690 | A | 12/1990 | Torres |
| 5,072,412 | A | 12/1991 | Henderson, Jr. et al. |
| 5,493,692 | A | 2/1996 | Theimer et al. |
| 5,713,073 | A | 1/1998 | Warsta |
| 5,754,939 | A | 5/1998 | Herz et al. |
| 5,855,008 | A | 12/1998 | Goldhaber et al. |
| 5,883,639 | A | 3/1999 | Walton et al. |
| 5,999,932 | A | 12/1999 | Paul |
| 6,012,098 | A | 1/2000 | Bayeh et al. |
| 6,014,090 | A | 1/2000 | Rosen et al. |
| 6,029,141 | A | 2/2000 | Bezos et al. |
| 6,038,295 | A | 3/2000 | Mattes |
| 6,049,711 | A | 4/2000 | Yehezkel et al. |
| 6,154,764 | A | 11/2000 | Nitta et al. |
| 6,167,435 | A | 12/2000 | Druckenmiller et al. |
| 6,204,840 | B1 | 3/2001 | Petelycky et al. |
| 6,205,432 | B1 | 3/2001 | Gabbard et al. |
| 6,216,141 | B1 | 4/2001 | Straub et al. |
| 6,285,381 | B1 | 9/2001 | Sawano et al. |
| 6,285,987 | B1 | 9/2001 | Roth et al. |
| 6,310,694 | B1 | 10/2001 | Okimoto et al. |
| 6,317,789 | B1 | 11/2001 | Rakavy et al. |
| 6,334,149 | B1 | 12/2001 | Davis, Jr. et al. |
| 6,349,203 | B1 | 2/2002 | Asaoka et al. |
| 6,353,170 | B1 | 3/2002 | Eyzaguirre et al. |
| 6,446,004 | B1 | 9/2002 | Cao et al. |
| 6,449,657 | B2 | 9/2002 | Stanbach et al. |
| 6,456,852 | B2 | 9/2002 | Bar et al. |
| 6,484,196 | B1 | 11/2002 | Maurille |
| 6,487,601 | B1 | 11/2002 | Hubacher et al. |
| 6,523,008 | B1 | 2/2003 | Avrunin et al. |
| 6,542,749 | B2 | 4/2003 | Tanaka et al. |
| 6,549,768 | B1 | 4/2003 | Fraccaroli |
| 6,618,593 | B1 | 9/2003 | Drutman et al. |
| 6,622,174 | B1 | 9/2003 | Ukita et al. |
| 6,631,463 | B1 | 10/2003 | Floyd et al. |
| 6,636,247 | B1 | 10/2003 | Hamzy et al. |
| 6,636,855 | B2 | 10/2003 | Holloway et al. |
| 6,643,684 | B1 | 11/2003 | Malkin et al. |
| 6,658,095 | B1 | 12/2003 | Yoakum et al. |
| 6,665,531 | B1 | 12/2003 | Soderbacka et al. |
| 6,668,173 | B2 | 12/2003 | Greene |
| 6,684,238 | B1 | 1/2004 | Dutta |
| 6,684,257 | B1 | 1/2004 | Camut et al. |
| 6,698,020 | B1 | 2/2004 | Zigmond et al. |
| 6,700,506 | B1 | 3/2004 | Winkler |
| 6,720,860 | B1 | 4/2004 | Narayanaswami |
| 6,724,403 | B1 | 4/2004 | Santoro et al. |
| 6,757,713 | B1 | 6/2004 | Ogilvie et al. |
| 6,832,222 | B1 | 12/2004 | Zimowski |
| 6,834,195 | B2 | 12/2004 | Brandenberg et al. |
| 6,836,792 | B1 | 12/2004 | Chen |
| 6,898,626 | B2 | 5/2005 | Ohashi |
| 6,959,324 | B1 | 10/2005 | Kubik |
| 6,970,088 | B2 | 11/2005 | Kovach |
| 6,970,907 | B1 | 11/2005 | Ullmann et al. |
| 6,980,909 | B2 | 12/2005 | Root et al. |
| 6,981,040 | B1 | 12/2005 | Konig et al. |
| 7,020,494 | B2 | 3/2006 | Spriestersbach et al. |
| 7,027,124 | B2 | 4/2006 | Foote et al. |
| 7,072,963 | B2 | 7/2006 | Anderson et al. |
| 7,085,571 | B2 | 8/2006 | Kalhan et al. |
| 7,110,744 | B2 | 9/2006 | Freeny, Jr. |
| 7,124,164 | B1 | 10/2006 | Chemtob |
| 7,149,893 | B1 | 12/2006 | Leonard et al. |
| 7,173,651 | B1 | 2/2007 | Knowles |
| 7,188,143 | B2 | 3/2007 | Szeto |
| 7,203,380 | B2 | 4/2007 | Chiu et al. |
| 7,206,568 | B2 | 4/2007 | Sudit |
| 7,227,937 | B1 | 6/2007 | Yoakum et al. |
| 7,237,002 | B1 | 6/2007 | Estrada et al. |
| 7,240,089 | B2 | 7/2007 | Boudreau |
| 7,269,426 | B2 | 9/2007 | Kokkonen et al. |
| 7,280,658 | B2 | 10/2007 | Amini et al. |
| 7,315,823 | B2 | 1/2008 | Brondrup |
| 7,349,768 | B2 | 3/2008 | Bruce et al. |
| 7,356,564 | B2 | 4/2008 | Hartselle et al. |
| 7,394,345 | B1 | 7/2008 | Ehlinger et al. |
| 7,411,493 | B2 | 8/2008 | Smith |
| 7,423,580 | B2 | 9/2008 | Markhovsky et al. |
| 7,454,442 | B2 | 11/2008 | Cobleigh et al. |
| 7,508,419 | B2 | 3/2009 | Toyama et al. |
| 7,512,649 | B2 | 3/2009 | Faybishenko et al. |
| 7,519,670 | B2 | 4/2009 | Hagale et al. |
| 7,535,890 | B2 | 5/2009 | Rojas |
| 7,546,554 | B2 | 6/2009 | Chiu et al. |
| 7,607,096 | B2 | 10/2009 | Oreizy et al. |
| 7,639,943 | B1 | 12/2009 | Kalajan |
| 7,650,231 | B2 | 1/2010 | Gadler |
| 7,668,537 | B2 | 2/2010 | DeVries |
| 7,770,137 | B2 | 8/2010 | Forbes et al. |
| 7,778,973 | B2 | 8/2010 | Choi |
| 7,779,444 | B2 | 8/2010 | Glad |
| 7,787,886 | B2 | 8/2010 | Markhovsky et al. |
| 7,796,946 | B2 | 9/2010 | Eisenbach |
| 7,801,954 | B2 | 9/2010 | Cadiz et al. |
| 7,856,360 | B2 | 12/2010 | Kramer et al. |
| 8,001,204 | B2 | 8/2011 | Burtner et al. |
| 8,032,586 | B2 | 10/2011 | Challenger et al. |
| 8,082,255 | B1 | 12/2011 | Carlson, Jr. et al. |
| 8,090,351 | B2 | 1/2012 | Klein |
| 8,098,904 | B2 | 1/2012 | Ioffe et al. |
| 8,099,109 | B2 | 1/2012 | Altman et al. |
| 8,112,716 | B2 | 2/2012 | Kobayashi |
| 8,131,597 | B2 | 3/2012 | Hudetz |
| 8,135,166 | B2 | 3/2012 | Rhoads |
| 8,136,028 | B1 | 3/2012 | Loeb et al. |
| 8,146,001 | B1 | 3/2012 | Reese |
| 8,161,115 | B2 | 4/2012 | Yamamoto |
| 8,161,417 | B1 | 4/2012 | Lee |
| 8,195,203 | B1 | 6/2012 | Tseng |
| 8,199,747 | B2 | 6/2012 | Rojas et al. |
| 8,208,943 | B2 | 6/2012 | Petersen |
| 8,214,443 | B2 | 7/2012 | Hamburg |
| 8,234,350 | B1 | 7/2012 | Gu et al. |
| 8,276,092 | B1 | 9/2012 | Narayanan et al. |
| 8,279,319 | B2 | 10/2012 | Date |
| 8,280,406 | B2 | 10/2012 | Ziskind et al. |
| 8,285,199 | B2 | 10/2012 | Hsu et al. |
| 8,287,380 | B2 | 10/2012 | Nguyen et al. |
| 8,301,159 | B2 | 10/2012 | Hamynen et al. |
| 8,306,922 | B1 | 11/2012 | Kunal et al. |
| 8,312,086 | B2 | 11/2012 | Velusamy et al. |
| 8,312,097 | B1 | 11/2012 | Siegel et al. |
| 8,326,315 | B2 | 12/2012 | Phillips et al. |
| 8,326,327 | B2 | 12/2012 | Hymel et al. |
| 8,332,475 | B2 | 12/2012 | Rosen et al. |
| 8,352,546 | B1 | 1/2013 | Dollard |
| 8,379,130 | B2 | 2/2013 | Forutanpour et al. |
| 8,385,950 | B1 | 2/2013 | Wagner et al. |
| 8,402,097 | B2 | 3/2013 | Szeto |
| 8,405,773 | B2 | 3/2013 | Hayashi et al. |
| 8,418,067 | B2 | 4/2013 | Cheng et al. |
| 8,423,409 | B2 | 4/2013 | Rao |
| 8,471,914 | B2 | 6/2013 | Sakiyama et al. |
| 8,472,935 | B1 | 6/2013 | Fujisaki |
| 8,510,383 | B2 | 8/2013 | Hurley et al. |
| 8,527,345 | B2 | 9/2013 | Rothschild et al. |
| 8,554,627 | B2 | 10/2013 | Svendsen et al. |
| 8,560,612 | B2 | 10/2013 | Kilmer et al. |
| 8,594,680 | B2 | 11/2013 | Ledlie et al. |
| 8,613,089 | B1 | 12/2013 | Holloway et al. |
| 8,660,358 | B1 | 2/2014 | Bergboer et al. |
| 8,660,369 | B2 | 2/2014 | Llano et al. |
| 8,660,793 | B2 | 2/2014 | Ngo et al. |
| 8,682,350 | B2 | 3/2014 | Altman et al. |
| 8,718,333 | B2 | 5/2014 | Wolf et al. |
| 8,724,622 | B2 | 5/2014 | Rojas |
| 8,732,168 | B2 | 5/2014 | Johnson |

(56) References Cited

U.S. PATENT DOCUMENTS 8,744,523 B2 6/2014 Fan et al.
8,745,132 B2 6/2014 Obradovich
8,761,800 B2 6/2014 Kuwahara
8,768,876 B2 7/2014 Shim et al.
8,775,972 B2 7/2014 Spiegel
8,788,680 B1 7/2014 Naik
8,790,187 B2 7/2014 Walker et al.
8,797,415 B2 8/2014 Arnold
8,798,646 B1 8/2014 Wang et al.
8,856,349 B2 10/2014 Jain et al.
8,874,677 B2 10/2014 Rosen et al.
8,886,227 B2 11/2014 Schmidt et al.
8,909,679 B2 12/2014 Root et al.
8,909,725 B1 12/2014 Sehn
8,972,357 B2 3/2015 Shim et al.
8,995,433 B2 3/2015 Rojas
9,015,285 B1 4/2015 Ebsen et al.
9,020,745 B2 4/2015 Johnston et al.
9,040,574 B2 5/2015 Wang et al.
9,055,416 B2 6/2015 Rosen et al.
9,094,137 B1 7/2015 Sehn et al.
9,100,806 B2 8/2015 Rosen et al.
9,100,807 B2 8/2015 Rosen et al.
9,113,301 B1 8/2015 Spiegel et al.
9,119,027 B2 8/2015 Sharon et al.
9,123,074 B2 9/2015 Jacobs et al.
9,143,382 B2 9/2015 Bhogal et al.
9,143,681 B1 9/2015 Ebsen et al.
9,152,477 B1 10/2015 Campbell et al.
9,191,776 B2 11/2015 Root et al.
9,204,252 B2 12/2015 Root
9,225,897 B1 12/2015 Sehn et al.
9,258,459 B2 2/2016 Hartley
9,344,606 B2 5/2016 Hartley et al.
9,385,983 B1 7/2016 Sehn
9,396,354 B1 7/2016 Murphy et al.
9,407,712 B1 8/2016 Sehn
9,407,816 B1 8/2016 Sehn
9,430,783 B1 8/2016 Sehn
9,439,041 B2 9/2016 Parvizi et al.
9,443,227 B2 9/2016 Evans et al.
9,450,907 B2 9/2016 Pridmore et al.
9,459,778 B2 10/2016 Hogeg et al.
9,489,661 B2 11/2016 Evans et al.
9,491,134 B2 11/2016 Rosen et al.
9,532,171 B2 12/2016 Allen et al.
9,537,811 B2 1/2017 Allen et al.
9,628,950 B1 4/2017 Noeth et al.
9,710,821 B2 7/2017 Heath
9,854,219 B2 12/2017 Sehn
10,318,569 B1 6/2019 Funk et al.
10,679,393 B2 6/2020 Canberk et al.
10,789,749 B2 9/2020 Canberk et al.
2002/0047868 A1 4/2002 Miyazawa
2002/0078456 A1 6/2002 Hudson et al.
2002/0087631 A1 7/2002 Sharma
2002/0097257 A1 7/2002 Miller et al.
2002/0122659 A1 9/2002 Mcgrath et al.
2002/0128047 A1 9/2002 Gates
2002/0144154 A1 10/2002 Tomkow
2003/0001846 A1 1/2003 Davis et al.
2003/0016247 A1 1/2003 Lai et al.
2003/0017823 A1 1/2003 Mager et al.
2003/0020623 A1 1/2003 Cao et al.
2003/0023874 A1 1/2003 Prokupets et al.
2003/0037124 A1 2/2003 Yamaura et al.
2003/0052925 A1 3/2003 Daimon et al.
2003/0101230 A1 5/2003 Benschoter et al.
2003/0110503 A1 6/2003 Perkes
2003/0126215 A1 7/2003 Udell
2003/0148773 A1 8/2003 Spriestersbach et al.
2003/0164856 A1 9/2003 Prager et al.
2003/0229607 A1 12/2003 Zellweger et al.
2004/0027371 A1 2/2004 Jaeger
2004/0064429 A1 4/2004 Hirstius et al.
2004/0078367 A1 4/2004 Anderson et al.
2004/0111467 A1 6/2004 Willis
2004/0158739 A1 8/2004 Wakai et al.
2004/0189465 A1 9/2004 Capobianco et al.
2004/0203959 A1 10/2004 Coombes
2004/0215625 A1 10/2004 Svendsen et al.
2004/0243531 A1 12/2004 Dean
2004/0243688 A1 12/2004 Wugofski
2005/0021444 A1 1/2005 Bauer et al.
2005/0022211 A1 1/2005 Veselov et al.
2005/0048989 A1 3/2005 Jung
2005/0056997 A1 3/2005 Wakitani et al.
2005/0078804 A1 4/2005 Yomoda
2005/0097176 A1 5/2005 Schatz et al.
2005/0102381 A1 5/2005 Jiang et al.
2005/0104976 A1 5/2005 Currans
2005/0114783 A1 5/2005 Szeto
2005/0119936 A1 6/2005 Buchanan et al.
2005/0122405 A1 6/2005 Voss et al.
2005/0193340 A1 9/2005 Amburgey et al.
2005/0193345 A1 9/2005 Klassen et al.
2005/0198128 A1 9/2005 Anderson et al.
2005/0223066 A1 10/2005 Buchheit et al.
2005/0288954 A1 12/2005 McCarthy et al.
2006/0026067 A1 2/2006 Nicholas et al.
2006/0107297 A1 5/2006 Toyama et al.
2006/0114338 A1 6/2006 Rothschild
2006/0119882 A1 6/2006 Harris et al.
2006/0242239 A1 10/2006 Morishima et al.
2006/0252438 A1 11/2006 Ansamaa et al.
2006/0265417 A1 11/2006 Amato et al.
2006/0270419 A1 11/2006 Crowley et al.
2006/0287878 A1 12/2006 Wadhwa et al.
2007/0004426 A1 1/2007 Pfleging et al.
2007/0038715 A1 2/2007 Collins et al.
2007/0040931 A1 2/2007 Nishizawa
2007/0073517 A1 3/2007 Panje
2007/0073823 A1 3/2007 Cohen et al.
2007/0075898 A1 4/2007 Markhovsky et al.
2007/0082707 A1 4/2007 Flynt et al.
2007/0136228 A1 6/2007 Petersen
2007/0192128 A1 8/2007 Celestini
2007/0198340 A1 8/2007 Lucovsky et al.
2007/0198495 A1 8/2007 Buron et al.
2007/0208751 A1 9/2007 Cowan et al.
2007/0210936 A1 9/2007 Nicholson
2007/0214180 A1 9/2007 Crawford
2007/0214216 A1 9/2007 Carrer et al.
2007/0233556 A1 10/2007 Koningstein
2007/0233801 A1 10/2007 Eren et al.
2007/0233859 A1 10/2007 Zhao et al.
2007/0243887 A1 10/2007 Bandhole et al.
2007/0244750 A1 10/2007 Grannan et al.
2007/0255456 A1 11/2007 Funayama
2007/0281690 A1 12/2007 Altman et al.
2008/0022329 A1 1/2008 Glad
2008/0025701 A1 1/2008 Ikeda
2008/0032703 A1 2/2008 Krumm et al.
2008/0033930 A1 2/2008 Warren
2008/0043041 A2 2/2008 Hedenstroem et al.
2008/0049704 A1 2/2008 Witteman et al.
2008/0062141 A1 3/2008 Chandhri
2008/0076505 A1 3/2008 Nguyen et al.
2008/0092233 A1 4/2008 Tian et al.
2008/0094387 A1 4/2008 Chen
2008/0104503 A1 5/2008 Beall et al.
2008/0109844 A1 5/2008 Baldeschwieler et al.
2008/0120409 A1 5/2008 Sun et al.
2008/0147730 A1 6/2008 Lee et al.
2008/0148150 A1 6/2008 Mall
2008/0158230 A1 7/2008 Sharma et al.
2008/0168033 A1 7/2008 Ott et al.
2008/0168489 A1 7/2008 Schraga
2008/0189177 A1 8/2008 Anderton et al.
2008/0207176 A1 8/2008 Brackbill et al.
2008/0208692 A1 8/2008 Garaventi et al.
2008/0214210 A1 9/2008 Rasanen et al.
2008/0222545 A1 9/2008 Lemay et al.
2008/0255976 A1 10/2008 Altberg et al.

(56) References Cited

U.S. PATENT DOCUMENTS

| | | | |
|---|---|---|---|
| 2008/0256446 | A1 | 10/2008 | Yamamoto |
| 2008/0256577 | A1 | 10/2008 | Funaki et al. |
| 2008/0266421 | A1 | 10/2008 | Takahata et al. |
| 2008/0270938 | A1 | 10/2008 | Carlson |
| 2008/0288338 | A1 | 11/2008 | Wiseman et al. |
| 2008/0306826 | A1 | 12/2008 | Kramer et al. |
| 2008/0313329 | A1 | 12/2008 | Wang et al. |
| 2008/0313346 | A1 | 12/2008 | Kujawa et al. |
| 2008/0318616 | A1 | 12/2008 | Chipalkatti et al. |
| 2009/0006191 | A1 | 1/2009 | Arankalle et al. |
| 2009/0006565 | A1 | 1/2009 | Velusamy et al. |
| 2009/0015703 | A1 | 1/2009 | Kim et al. |
| 2009/0024956 | A1 | 1/2009 | Kobayashi |
| 2009/0030774 | A1 | 1/2009 | Rothschild et al. |
| 2009/0030999 | A1 | 1/2009 | Gatzke et al. |
| 2009/0040324 | A1 | 2/2009 | Nonaka |
| 2009/0042588 | A1 | 2/2009 | Lottin et al. |
| 2009/0058822 | A1 | 3/2009 | Chaudhri |
| 2009/0079846 | A1 | 3/2009 | Chou |
| 2009/0089678 | A1 | 4/2009 | Sacco et al. |
| 2009/0089710 | A1 | 4/2009 | Wood et al. |
| 2009/0093261 | A1 | 4/2009 | Ziskind et al. |
| 2009/0132341 | A1 | 5/2009 | Klinger et al. |
| 2009/0132453 | A1 | 5/2009 | Hangartner et al. |
| 2009/0132665 | A1 | 5/2009 | Thomsen et al. |
| 2009/0148045 | A1 | 6/2009 | Lee et al. |
| 2009/0153492 | A1 | 6/2009 | Popp |
| 2009/0157450 | A1 | 6/2009 | Athsani et al. |
| 2009/0157752 | A1 | 6/2009 | Gonzalez |
| 2009/0160970 | A1 | 6/2009 | Fredlund et al. |
| 2009/0163182 | A1 | 6/2009 | Gatti et al. |
| 2009/0177299 | A1 | 7/2009 | Van De Sluis |
| 2009/0192900 | A1 | 7/2009 | Collison |
| 2009/0199242 | A1 | 8/2009 | Johnson et al. |
| 2009/0215469 | A1 | 8/2009 | Fisher et al. |
| 2009/0232354 | A1 | 9/2009 | Camp, Jr. et al. |
| 2009/0234815 | A1 | 9/2009 | Boerries et al. |
| 2009/0239552 | A1 | 9/2009 | Churchill et al. |
| 2009/0249222 | A1 | 10/2009 | Schmidt et al. |
| 2009/0249244 | A1 | 10/2009 | Robinson et al. |
| 2009/0265647 | A1 | 10/2009 | Martin et al. |
| 2009/0288022 | A1 | 11/2009 | Almstrand et al. |
| 2009/0291672 | A1 | 11/2009 | Treves et al. |
| 2009/0292608 | A1 | 11/2009 | Polachek |
| 2009/0319607 | A1 | 12/2009 | Belz et al. |
| 2009/0327073 | A1 | 12/2009 | Li |
| 2010/0062794 | A1 | 3/2010 | Han |
| 2010/0082427 | A1 | 4/2010 | Burgener et al. |
| 2010/0082693 | A1 | 4/2010 | Hugg et al. |
| 2010/0100568 | A1 | 4/2010 | Papin et al. |
| 2010/0113065 | A1 | 5/2010 | Narayan et al. |
| 2010/0130233 | A1 | 5/2010 | Parker |
| 2010/0131880 | A1 | 5/2010 | Lee et al. |
| 2010/0131895 | A1 | 5/2010 | Wohlert |
| 2010/0153144 | A1 | 6/2010 | Miller et al. |
| 2010/0159944 | A1 | 6/2010 | Pascal et al. |
| 2010/0161658 | A1 | 6/2010 | Hamynen et al. |
| 2010/0161831 | A1 | 6/2010 | Haas et al. |
| 2010/0162149 | A1 | 6/2010 | Sheleheda et al. |
| 2010/0183280 | A1 | 7/2010 | Beauregard et al. |
| 2010/0185552 | A1 | 7/2010 | Deluca et al. |
| 2010/0185665 | A1 | 7/2010 | Horn et al. |
| 2010/0191631 | A1 | 7/2010 | Weidmann |
| 2010/0197318 | A1 | 8/2010 | Petersen et al. |
| 2010/0197319 | A1 | 8/2010 | Petersen et al. |
| 2010/0198683 | A1 | 8/2010 | Aarabi |
| 2010/0198694 | A1 | 8/2010 | Muthukrishnan |
| 2010/0198826 | A1 | 8/2010 | Petersen et al. |
| 2010/0198828 | A1 | 8/2010 | Petersen et al. |
| 2010/0198862 | A1 | 8/2010 | Jennings et al. |
| 2010/0198870 | A1 | 8/2010 | Petersen et al. |
| 2010/0198917 | A1 | 8/2010 | Petersen et al. |
| 2010/0201482 | A1 | 8/2010 | Robertson et al. |
| 2010/0201536 | A1 | 8/2010 | Robertson et al. |
| 2010/0214436 | A1 | 8/2010 | Kim et al. |
| 2010/0223128 | A1 | 9/2010 | Dukellis et al. |
| 2010/0223343 | A1 | 9/2010 | Bosan et al. |
| 2010/0250109 | A1 | 9/2010 | Johnston et al. |
| 2010/0257196 | A1 | 10/2010 | Waters et al. |
| 2010/0259386 | A1 | 10/2010 | Holley et al. |
| 2010/0273509 | A1 | 10/2010 | Sweeney et al. |
| 2010/0281045 | A1 | 11/2010 | Dean |
| 2010/0306669 | A1 | 12/2010 | Della Pasqua |
| 2011/0004071 | A1 | 1/2011 | Faiola et al. |
| 2011/0010205 | A1 | 1/2011 | Richards |
| 2011/0029512 | A1 | 2/2011 | Folgner et al. |
| 2011/0040783 | A1 | 2/2011 | Uemichi et al. |
| 2011/0040804 | A1 | 2/2011 | Peirce et al. |
| 2011/0050909 | A1 | 3/2011 | Ellenby et al. |
| 2011/0050915 | A1 | 3/2011 | Wang et al. |
| 2011/0064388 | A1 | 3/2011 | Brown et al. |
| 2011/0066743 | A1 | 3/2011 | Hurley et al. |
| 2011/0083101 | A1 | 4/2011 | Sharon et al. |
| 2011/0102630 | A1 | 5/2011 | Rukes |
| 2011/0119133 | A1 | 5/2011 | Igelman et al. |
| 2011/0137881 | A1 | 6/2011 | Cheng et al. |
| 2011/0145564 | A1 | 6/2011 | Moshir et al. |
| 2011/0159890 | A1 | 6/2011 | Fortescue et al. |
| 2011/0164163 | A1 | 7/2011 | Bilbrey et al. |
| 2011/0187743 | A1 | 8/2011 | Hwang et al. |
| 2011/0197194 | A1 | 8/2011 | D'Angelo et al. |
| 2011/0202598 | A1 | 8/2011 | Evans et al. |
| 2011/0202968 | A1 | 8/2011 | Nurmi |
| 2011/0211534 | A1 | 9/2011 | Schmidt et al. |
| 2011/0213845 | A1 | 9/2011 | Logan et al. |
| 2011/0215966 | A1 | 9/2011 | Kim et al. |
| 2011/0225048 | A1 | 9/2011 | Nair |
| 2011/0238763 | A1 | 9/2011 | Shin et al. |
| 2011/0242134 | A1 | 10/2011 | Miller et al. |
| 2011/0255736 | A1 | 10/2011 | Thompson et al. |
| 2011/0273575 | A1 | 11/2011 | Lee |
| 2011/0282799 | A1 | 11/2011 | Huston |
| 2011/0283188 | A1 | 11/2011 | Farrenkopf |
| 2011/0314419 | A1 | 12/2011 | Dunn et al. |
| 2011/0320373 | A1 | 12/2011 | Lee et al. |
| 2012/0028659 | A1 | 2/2012 | Whitney et al. |
| 2012/0033718 | A1 | 2/2012 | Kauffman et al. |
| 2012/0036015 | A1 | 2/2012 | Sheikh |
| 2012/0036443 | A1 | 2/2012 | Ohmori et al. |
| 2012/0054797 | A1 | 3/2012 | Skog et al. |
| 2012/0059722 | A1 | 3/2012 | Rao |
| 2012/0062805 | A1 | 3/2012 | Candelore |
| 2012/0075285 | A1 * | 3/2012 | Oyagi .................. A63F 13/655 345/419 |
| 2012/0084731 | A1 | 4/2012 | Filman et al. |
| 2012/0084835 | A1 | 4/2012 | Thomas et al. |
| 2012/0099800 | A1 | 4/2012 | Llano et al. |
| 2012/0108293 | A1 | 5/2012 | Law et al. |
| 2012/0110096 | A1 | 5/2012 | Smarr et al. |
| 2012/0113143 | A1 | 5/2012 | Adhikari et al. |
| 2012/0113272 | A1 | 5/2012 | Hata |
| 2012/0123830 | A1 | 5/2012 | Svendsen et al. |
| 2012/0123871 | A1 | 5/2012 | Svendsen et al. |
| 2012/0124126 | A1 | 5/2012 | Alcazar et al. |
| 2012/0124176 | A1 | 5/2012 | Curtis et al. |
| 2012/0124458 | A1 | 5/2012 | Cruzada |
| 2012/0131507 | A1 | 5/2012 | Sparandara et al. |
| 2012/0131512 | A1 | 5/2012 | Takeuchi et al. |
| 2012/0143760 | A1 | 6/2012 | Abulafia et al. |
| 2012/0150978 | A1 | 6/2012 | Monaco |
| 2012/0165100 | A1 | 6/2012 | Lalancette et al. |
| 2012/0166971 | A1 | 6/2012 | Sachson et al. |
| 2012/0169855 | A1 | 7/2012 | Oh |
| 2012/0172062 | A1 | 7/2012 | Altman et al. |
| 2012/0173991 | A1 | 7/2012 | Roberts et al. |
| 2012/0176401 | A1 | 7/2012 | Hayward et al. |
| 2012/0184248 | A1 | 7/2012 | Speede |
| 2012/0197724 | A1 | 8/2012 | Kendall |
| 2012/0200743 | A1 | 8/2012 | Blanchflower et al. |
| 2012/0209924 | A1 | 8/2012 | Evans et al. |
| 2012/0210244 | A1 | 8/2012 | De Francisco et al. |
| 2012/0212632 | A1 | 8/2012 | Mate et al. |
| 2012/0218300 | A1 | 8/2012 | Hayakawa |
| 2012/0220264 | A1 | 8/2012 | Kawabata |

(56) References Cited

U.S. PATENT DOCUMENTS

| | | | |
|---|---|---|---|
| 2012/0226748 | A1 | 9/2012 | Bosworth et al. |
| 2012/0233000 | A1 | 9/2012 | Fisher et al. |
| 2012/0236162 | A1 | 9/2012 | Imamura |
| 2012/0239761 | A1 | 9/2012 | Linner et al. |
| 2012/0250951 | A1 | 10/2012 | Chen |
| 2012/0252418 | A1 | 10/2012 | Kandekar et al. |
| 2012/0254325 | A1 | 10/2012 | Majeti et al. |
| 2012/0278387 | A1 | 11/2012 | Garcia et al. |
| 2012/0278692 | A1 | 11/2012 | Shi |
| 2012/0290637 | A1 | 11/2012 | Perantatos et al. |
| 2012/0299954 | A1 | 11/2012 | Wada et al. |
| 2012/0304052 | A1 | 11/2012 | Tanaka et al. |
| 2012/0304080 | A1 | 11/2012 | Wormald et al. |
| 2012/0307096 | A1 | 12/2012 | Ford et al. |
| 2012/0307112 | A1 | 12/2012 | Kunishige et al. |
| 2012/0319904 | A1 | 12/2012 | Lee et al. |
| 2012/0323933 | A1 | 12/2012 | He et al. |
| 2012/0324018 | A1 | 12/2012 | Metcalf et al. |
| 2013/0006759 | A1 | 1/2013 | Srivastava et al. |
| 2013/0024757 | A1 | 1/2013 | Doll et al. |
| 2013/0036364 | A1 | 2/2013 | Johnson |
| 2013/0045753 | A1 | 2/2013 | Obermeyer et al. |
| 2013/0050260 | A1 | 2/2013 | Reitan |
| 2013/0055083 | A1 | 2/2013 | Fino |
| 2013/0057587 | A1 | 3/2013 | Leonard et al. |
| 2013/0059607 | A1 | 3/2013 | Herz et al. |
| 2013/0060690 | A1 | 3/2013 | Oskolkov et al. |
| 2013/0063369 | A1 | 3/2013 | Malhotra et al. |
| 2013/0067027 | A1 | 3/2013 | Song et al. |
| 2013/0071093 | A1 | 3/2013 | Hanks et al. |
| 2013/0080254 | A1 | 3/2013 | Thramann |
| 2013/0085790 | A1 | 4/2013 | Palmer et al. |
| 2013/0086072 | A1 | 4/2013 | Peng et al. |
| 2013/0090171 | A1 | 4/2013 | Holton et al. |
| 2013/0095857 | A1 | 4/2013 | Garcia et al. |
| 2013/0100165 | A1 | 4/2013 | Komiyama |
| 2013/0104053 | A1 | 4/2013 | Thornton et al. |
| 2013/0110885 | A1 | 5/2013 | Brundrett, III |
| 2013/0111514 | A1 | 5/2013 | Slavin et al. |
| 2013/0128059 | A1 | 5/2013 | Kristensson |
| 2013/0129252 | A1 | 5/2013 | Lauper |
| 2013/0132477 | A1 | 5/2013 | Bosworth et al. |
| 2013/0145286 | A1 | 6/2013 | Feng et al. |
| 2013/0147837 | A1 | 6/2013 | Stroila |
| 2013/0159110 | A1 | 6/2013 | Rajaram et al. |
| 2013/0159919 | A1 | 6/2013 | Leydon |
| 2013/0169822 | A1 | 7/2013 | Zhu et al. |
| 2013/0173729 | A1 | 7/2013 | Starenky et al. |
| 2013/0182133 | A1 | 7/2013 | Tanabe |
| 2013/0185131 | A1 | 7/2013 | Sinha et al. |
| 2013/0191198 | A1 | 7/2013 | Carlson et al. |
| 2013/0194301 | A1 | 8/2013 | Robbins et al. |
| 2013/0198176 | A1 | 8/2013 | Kim |
| 2013/0218965 | A1 | 8/2013 | Abrol et al. |
| 2013/0218968 | A1 | 8/2013 | Mcevilly et al. |
| 2013/0222323 | A1 | 8/2013 | Mckenzie |
| 2013/0227476 | A1 | 8/2013 | Frey |
| 2013/0232194 | A1 | 9/2013 | Knapp et al. |
| 2013/0263031 | A1 | 10/2013 | Oshiro et al. |
| 2013/0265450 | A1 | 10/2013 | Barnes, Jr. |
| 2013/0267253 | A1 | 10/2013 | Case et al. |
| 2013/0275505 | A1 | 10/2013 | Gauglitz et al. |
| 2013/0290443 | A1 | 10/2013 | Collins et al. |
| 2013/0304646 | A1 | 11/2013 | De Geer |
| 2013/0311255 | A1 | 11/2013 | Cummins et al. |
| 2013/0325964 | A1 | 12/2013 | Berberat |
| 2013/0344896 | A1 | 12/2013 | Kirmse et al. |
| 2013/0346869 | A1 | 12/2013 | Asver et al. |
| 2013/0346877 | A1 | 12/2013 | Borovoy et al. |
| 2014/0006129 | A1 | 1/2014 | Heath |
| 2014/0011538 | A1 | 1/2014 | Mulcahy et al. |
| 2014/0019264 | A1 | 1/2014 | Wachman et al. |
| 2014/0028712 | A1 | 1/2014 | Keating et al. |
| 2014/0032682 | A1 | 1/2014 | Prado et al. |
| 2014/0043204 | A1 | 2/2014 | Basnayake et al. |
| 2014/0045530 | A1 | 2/2014 | Gordon et al. |
| 2014/0047016 | A1 | 2/2014 | Rao |
| 2014/0047045 | A1 | 2/2014 | Baldwin et al. |
| 2014/0047335 | A1 | 2/2014 | Lewis et al. |
| 2014/0049652 | A1 | 2/2014 | Moon et al. |
| 2014/0052485 | A1 | 2/2014 | Shidfar |
| 2014/0052633 | A1 | 2/2014 | Gandhi |
| 2014/0055491 | A1 | 2/2014 | Malamud et al. |
| 2014/0057660 | A1 | 2/2014 | Wager |
| 2014/0063062 | A1 | 3/2014 | Fateh |
| 2014/0082651 | A1 | 3/2014 | Sharifi |
| 2014/0092130 | A1 | 4/2014 | Anderson et al. |
| 2014/0096029 | A1 | 4/2014 | Schultz |
| 2014/0114565 | A1 | 4/2014 | Aziz et al. |
| 2014/0122658 | A1 | 5/2014 | Haeger et al. |
| 2014/0122787 | A1 | 5/2014 | Shalvi et al. |
| 2014/0125701 | A1 | 5/2014 | Hayakawa |
| 2014/0129953 | A1 | 5/2014 | Spiegel |
| 2014/0143143 | A1 | 5/2014 | Fasoli et al. |
| 2014/0149519 | A1 | 5/2014 | Redfern et al. |
| 2014/0155102 | A1 | 6/2014 | Cooper et al. |
| 2014/0173424 | A1 | 6/2014 | Hogeg et al. |
| 2014/0173457 | A1 | 6/2014 | Wang et al. |
| 2014/0189592 | A1 | 7/2014 | Benchenaa et al. |
| 2014/0207679 | A1 | 7/2014 | Cho |
| 2014/0210859 | A1 | 7/2014 | Ihara et al. |
| 2014/0214471 | A1 | 7/2014 | Schreiner, III |
| 2014/0222564 | A1 | 8/2014 | Kranendonk et al. |
| 2014/0258405 | A1 | 9/2014 | Perkin |
| 2014/0265359 | A1 | 9/2014 | Cheng et al. |
| 2014/0266703 | A1 | 9/2014 | Dalley, Jr. et al. |
| 2014/0279061 | A1 | 9/2014 | Elimeliah et al. |
| 2014/0279436 | A1 | 9/2014 | Dorsey et al. |
| 2014/0279540 | A1 | 9/2014 | Jackson |
| 2014/0280537 | A1 | 9/2014 | Pridmore et al. |
| 2014/0282096 | A1 | 9/2014 | Rubinstein et al. |
| 2014/0287779 | A1 | 9/2014 | O'keefe et al. |
| 2014/0289833 | A1 | 9/2014 | Briceno |
| 2014/0306986 | A1 | 10/2014 | Gottesman et al. |
| 2014/0317302 | A1 | 10/2014 | Naik |
| 2014/0324627 | A1 | 10/2014 | Haver et al. |
| 2014/0324629 | A1 | 10/2014 | Jacobs |
| 2014/0325383 | A1 | 10/2014 | Brown et al. |
| 2014/0368542 | A1 | 12/2014 | Tawara et al. |
| 2015/0006276 | A1 | 1/2015 | Cohen |
| 2015/0020086 | A1 | 1/2015 | Chen et al. |
| 2015/0029220 | A1 | 1/2015 | Hittel et al. |
| 2015/0046278 | A1 | 2/2015 | Pei et al. |
| 2015/0071619 | A1 | 3/2015 | Brough |
| 2015/0087263 | A1 | 3/2015 | Branscomb et al. |
| 2015/0088622 | A1 | 3/2015 | Ganschow et al. |
| 2015/0095020 | A1 | 4/2015 | Leydon |
| 2015/0096042 | A1 | 4/2015 | Mizrachi |
| 2015/0116529 | A1 | 4/2015 | Wu et al. |
| 2015/0169827 | A1 | 6/2015 | Laborde |
| 2015/0172534 | A1 | 6/2015 | Miyakawaa et al. |
| 2015/0178260 | A1 | 6/2015 | Brunson |
| 2015/0222814 | A1 | 8/2015 | Li et al. |
| 2015/0261917 | A1 | 9/2015 | Smith |
| 2015/0262197 | A1 | 9/2015 | Chao et al. |
| 2015/0312184 | A1 | 10/2015 | Langholz et al. |
| 2015/0350136 | A1 | 12/2015 | Flynn, III et al. |
| 2015/0365795 | A1 | 12/2015 | Allen et al. |
| 2015/0378502 | A1 | 12/2015 | Hu et al. |
| 2016/0004320 | A1 | 1/2016 | Lundberg et al. |
| 2016/0006927 | A1 | 1/2016 | Sehn |
| 2016/0014063 | A1 | 1/2016 | Hogeg et al. |
| 2016/0085773 | A1 | 3/2016 | Chang et al. |
| 2016/0085863 | A1 | 3/2016 | Allen et al. |
| 2016/0093107 | A1 | 3/2016 | Yamamoto et al. |
| 2016/0099901 | A1 | 4/2016 | Allen et al. |
| 2016/0148430 | A1 | 5/2016 | Lin et al. |
| 2016/0180887 | A1 | 6/2016 | Sehn |
| 2016/0182422 | A1 | 6/2016 | Sehn et al. |
| 2016/0182875 | A1 | 6/2016 | Sehn |
| 2016/0239248 | A1 | 8/2016 | Sehn |
| 2016/0277419 | A1 | 9/2016 | Allen et al. |
| 2016/0321708 | A1 | 11/2016 | Sehn |
| 2017/0006094 | A1 | 1/2017 | Abou Mahmoud et al. |

(56) References Cited

U.S. PATENT DOCUMENTS

| | | | |
|---|---|---|---|
| 2017/0061308 | A1 | 3/2017 | Chen et al. |
| 2017/0199855 | A1 | 7/2017 | Fishbeck |
| 2017/0287006 | A1 | 10/2017 | Azmoodeh et al. |
| 2018/0005443 | A1 | 1/2018 | Poulos et al. |
| 2018/0114365 | A1 | 4/2018 | Egri et al. |
| 2018/0136465 | A1 | 5/2018 | Chi et al. |
| 2019/0011703 | A1 | 1/2019 | Robaina et al. |
| 2019/0130436 | A1 | 5/2019 | Ma et al. |
| 2020/0035003 | A1 | 1/2020 | Canberk et al. |
| 2020/0265626 | A1 | 8/2020 | Canberk et al. |

FOREIGN PATENT DOCUMENTS

| | | | |
|---|---|---|---|
| EP | 2151797 | A1 | 2/2010 |
| GB | 2399928 | A | 9/2004 |
| KR | 19990073076 | A | 10/1999 |
| KR | 20010078417 | A | 8/2001 |
| WO | WO-1996024213 | A1 | 8/1996 |
| WO | WO-1999063453 | A1 | 12/1999 |
| WO | WO-2000058882 | A1 | 10/2000 |
| WO | WO-2001029642 | A1 | 4/2001 |
| WO | WO-2001050703 | A3 | 7/2001 |
| WO | WO-200618755 | A2 | 11/2006 |
| WO | WO-2007092668 | A2 | 8/2007 |
| WO | WO-2009043020 | A2 | 4/2009 |
| WO | WO-2011040821 | A1 | 4/2011 |
| WO | WO-2011119407 | A1 | 9/2011 |
| WO | WO-2013008238 | A1 | 1/2013 |
| WO | WO-2013045753 | A1 | 4/2013 |
| WO | WO-2014006129 | A1 | 1/2014 |
| WO | WO-2014068573 | A1 | 5/2014 |
| WO | WO-2014115136 | A1 | 7/2014 |
| WO | WO-2014194262 | A2 | 12/2014 |
| WO | WO-2015192026 | A1 | 12/2015 |
| WO | WO-2016044424 | A1 | 3/2016 |
| WO | WO-2016054562 | A1 | 4/2016 |
| WO | WO-2016065131 | A1 | 4/2016 |
| WO | WO-2016100318 | A2 | 6/2016 |
| WO | WO-2016100318 | A3 | 6/2016 |
| WO | WO-2016100342 | A1 | 6/2016 |
| WO | WO-2016149594 | A1 | 9/2016 |
| WO | WO-2016179166 | A1 | 11/2016 |
| WO | WO-2020023264 | A1 | 1/2020 |

OTHER PUBLICATIONS

"Adding photos to your listing", eBay, [Online] Retrieved from the Internet: <URL: http://pages.ebay.com/help/sell/pictures.html, (accessed May 24, 2017), 4 pgs.

"U.S. Appl. No. 16/043,995, Non Final Office Action dated Oct. 31, 2019", 9 pgs.

"U.S. Appl. No. 16/043,995, Notice of Allowance dated Feb. 7, 2020", 8 pgs.

"U.S. Appl. No. 16/043,995, Response filed Jan. 20, 2020 to Non Final Office Action dated Oct. 31, 2019", 12 pgs.

"U.S. Appl. No. 16/868,315, Corrected Notice of Allowability dated Jul. 22, 2020", 5 pgs.

"U.S. Appl. No. 16/868,315, Notice of Allowance dated May 28, 2020", 8 pgs.

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell The Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report dated Sep. 29, 2015", 2 pgs.

"International Application Serial No. PCT/US2019/042183, International Search Report dated Oct. 30, 2019", 4 pgs.

"International Application Serial No. PCT/US2019/042183, Written Opinion dated Oct. 30, 2019". 5 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Macy's Believe-o-Magic", [Online] Retrieved from the Internet: <URL: https://web.archive.org/web/20190422101854/https://www.youtube.com/watch?v=xvzRXy3J0z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RG0w>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs., 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Fuste, Anna, "HoloBits: Creativity and Fun in Mixed Reality", URL: https://www.media.mit.edu/projects/holobits/overview/, (accessed May 11, 2018), 4 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Placenote, "Introduction to Piacenote SDK", URL: https://placenote.com/documentation/, (accessed May 17, 2018), 3 pgs.

Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.

Voropaev, Pavel, "AR Synchronization System by Prisma", URL: https://blog.prismalabs.ai/ar-synchronization-system-by-prisma-3c41ff55a2a7, (accessed May 11, 2018), 6 pgs.

* cited by examiner

CONDITIONAL MODIFICATION OF AUGMENTED REALITY OBJECT

CLAIM OF PRIORITY

This application is a continuation of U.S. patent application Ser. No. 16/868,315, filed on May 6, 2020, which is a continuation of U.S. patent application Ser. No. 16/043,995, filed on Jul. 24, 2018, each of which is incorporated herein by reference in their entireties.

TECHNICAL FIELD

The subject matter disclosed herein generally relates to the technical field of special-purpose machines that facilitate generation and presentation of computer graphics, including software-configured computerized variants of such special-purpose machines and improvements to such variants, and to the technologies by which such special-purpose machines become improved compared to other special-purpose machines that facilitate generation and presentation of computer graphics. Specifically, the present disclosure addresses systems and methods to facilitate presentation of an augmented reality (AR) object.

BACKGROUND

A machine (e.g., a user's device) may be configured to interact with one or more users by generating computer graphics and causing presentation thereof in an AR environment or a virtual reality (VR) environment. For example, a user's device in the example form of a smartphone may generate AR content (e.g., one or more AR objects) and cause the AR content to be displayed to the user (e.g., on a display screen of the smartphone or a head-mounted display (HMD) controlled by the smart phone).

BRIEF DESCRIPTION OF THE DRAWINGS

Some embodiments are illustrated by way of example and not limitation in the figures of the accompanying drawings.

DETAILED DESCRIPTION

Figure 1:
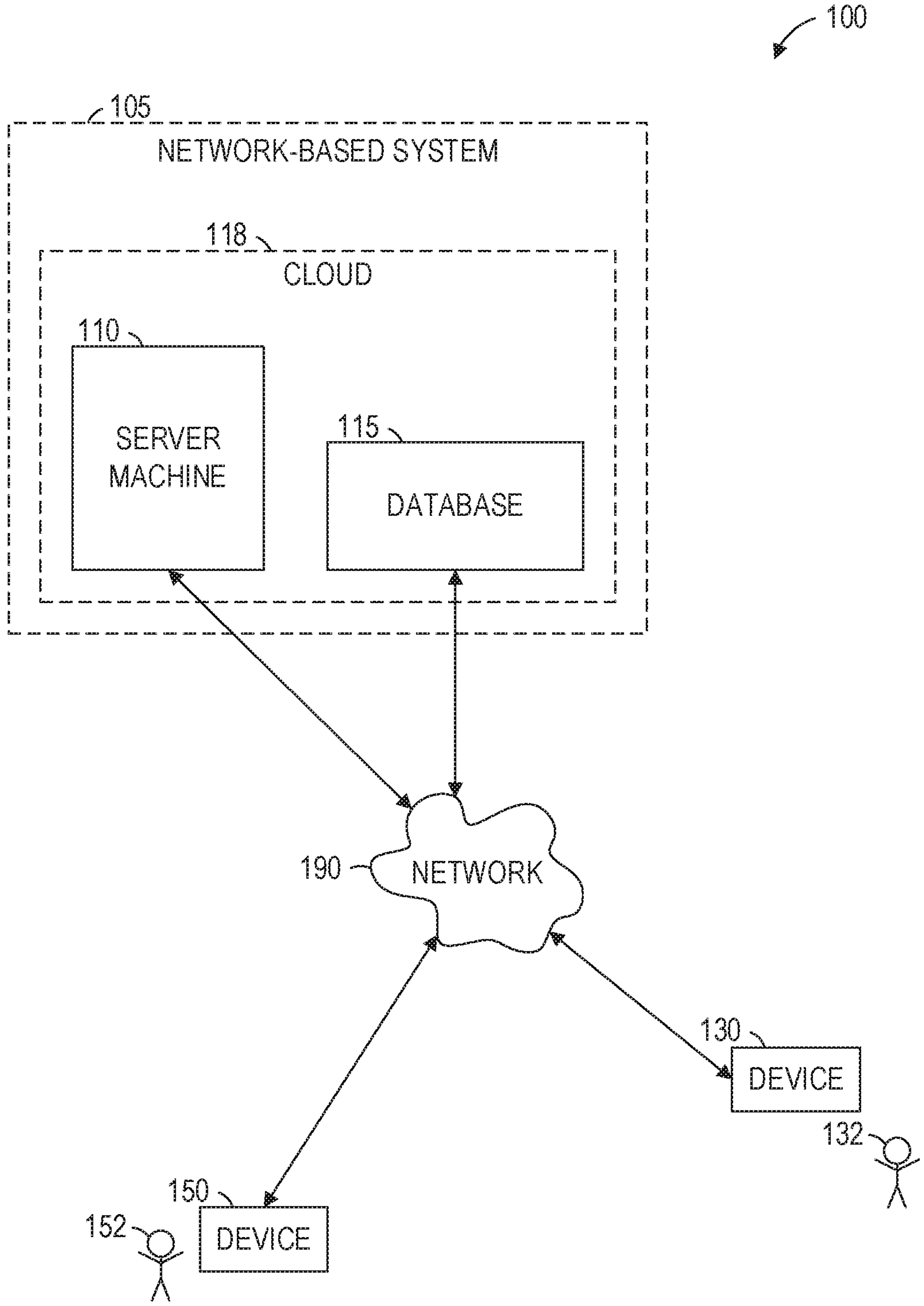
FIG. 1 is a network diagram illustrating a network environment suitable for facilitating conditional modification of an AR object, according to some example embodiments.

Example methods (e.g., algorithms) facilitate conditional modification of one or more AR objects, and example systems (e.g., special-purpose machines configured by special-purpose software) are configured to facilitate conditional modification of one or more AR objects. Examples merely typify possible variations, Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine (e.g., a server machine) is configured (e.g., by suitable software, hardware, or both) to provide a consistent set of one or more AR objects to one or more user devices (e.g., one or more smartphones, game controllers, HMDs, or combinations thereof), and the machine is configured to modify one or more of these AR objects in response to detected fulfillment of one or more conditions. For clarity and brevity, the discussion herein focuses on conditional modification of a single AR object, presented with an appearance of being present in the real world, though the example systems and methods discussed herein are applicable to conditional modification of multiple AR objects similarly presented.

Configured in accordance with the systems and methods discussed herein, the machine provides, to a user device, object data that defines an AR object. The object data of the AR object, in some example embodiments, specifies four things: (1) a physical geolocation of the AR object, (2) a presentation attribute of the AR object, (3) a conditional modification program of the AR object, and (4) a trigger condition for execution of the conditional modification program. The provided object data causes the user device, as well as any number of other user devices in the area, to present the AR object with a consistent first appearance and consistently located at the physical geolocation. The machine then detects fulfillment of the trigger condition specified by the object data, and based on the detected fulfillment of the trigger condition, the machine executes the conditional modification program of the AR object. The executing of the conditional modification program modifies the object data of the AR object by modifying the presentation attribute of the AR object. The machine next provides, to the user device, as well as any other user devices present, the modified object data of the AR object. The modified object data causes the user device, as well as any other user device in the area, to present the AR object with a consistent second appearance that is based on the modified presentation attribute of the AR object.

By causing the AR object to change from its first appearance to its second appearance, in accordance with the methodologies described herein, the machine provides interactivity between the AR object and one or more users. For example, the detected trigger condition may be or include a user or her device intersecting the AR object, and in response to this intersection, the AR object may change color (e.g., from gray to blue, darker hue to lighter hue, or both) and emit animated sparkles. As another example, the detected trigger condition may be or include an increase in ambient audio loudness, and in response to this increase, the AR object may change color and begin pulsating or flashing. As yet another example, the detected trigger condition may be or include a pattern of sound (e.g., a candidate pattern that matches a reference pattern, which may represent clapping, stomping, or chanting), and in response to this pattern of sound, the AR object may change size (e.g., appear to inflate).

As a further example, the detected trigger condition may be or include a user's device selecting the AR object for editing, and in response to this selection, the AR object may be displayed with a cursor or other visual highlight that indicates which portion of the AR object is ready to be edited. This may have the effect of assisting the user in planning or making an edit to the AR object. As a still further example, the detected trigger condition may be or include an interaction count transgressing a threshold value (e.g., a minimum or maximum interaction count), and in response to this transgression, the AR object may bounce vertically in space and emit animated fireworks. This may have the effect of indicating the attaining of a milestone in the AR object's user interactivity. As a yet further example, the detected trigger condition may be or include an interaction time transgressing a threshold value (e.g., minimum or maximum interaction time), and in response to this transgression, the AR object may change its size, its physical geolocation in the real world, or both. This may have the effect of altering the attractiveness or availability of the AR object for further interactions with users.

According to various example embodiments, the conditional modification program may be provided by the machine (e.g., as part of generating the object data of the AR object) or provided by a user's device (e.g., as an edit to the object data the AR object). In general, the object data of the AR object may contain one or more user-provided conditional modification programs, which may be a subset of all conditional modification programs specified for the AR object. In some example embodiments, a user-provided conditional modification program is incorporated by the machine into the object data for a specified period of time (e.g., in exchange for a fee payment or a task performance from the user's device). After the specified time period is over, the machine may remove the user-provided conditional modification program, prompt the user to renew the conditional modification program for an additional period of time, or both, FIG. 1 is a network diagram illustrating a network environment 100 suitable for conditional modification of an AR object, according to some example embodiments. The network environment 100 includes a server machine 110, a database 115, and devices 130 and 150, all communicatively coupled to each other via a network 190. The server machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services, such as AR services, to the devices 130 and 150). The server machine 110, the database 115, and the devices 130 and 150 may each be implemented in a special-purpose (e.g., specialized) computer system, in whole or in part, as described below with respect to FIG. 10.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a home media system (e.g., a home theater system or other home entertainment system), a tablet computer, a navigational device, a portable media device, a smartphone (e.g., with a touchscreen configured to detect one or more touch gestures), or a wearable device an HMD, such as an AR headset, a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a home media system (e.g., a home theater system or other home entertainment system), a tablet computer, a navigational device, a portable media device, a smartphone (e.g., with a touchscreen configured to detect one or more touch gestures), or a wearable device (e.g., an HMD such as an AR headset, a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 10, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or Max network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
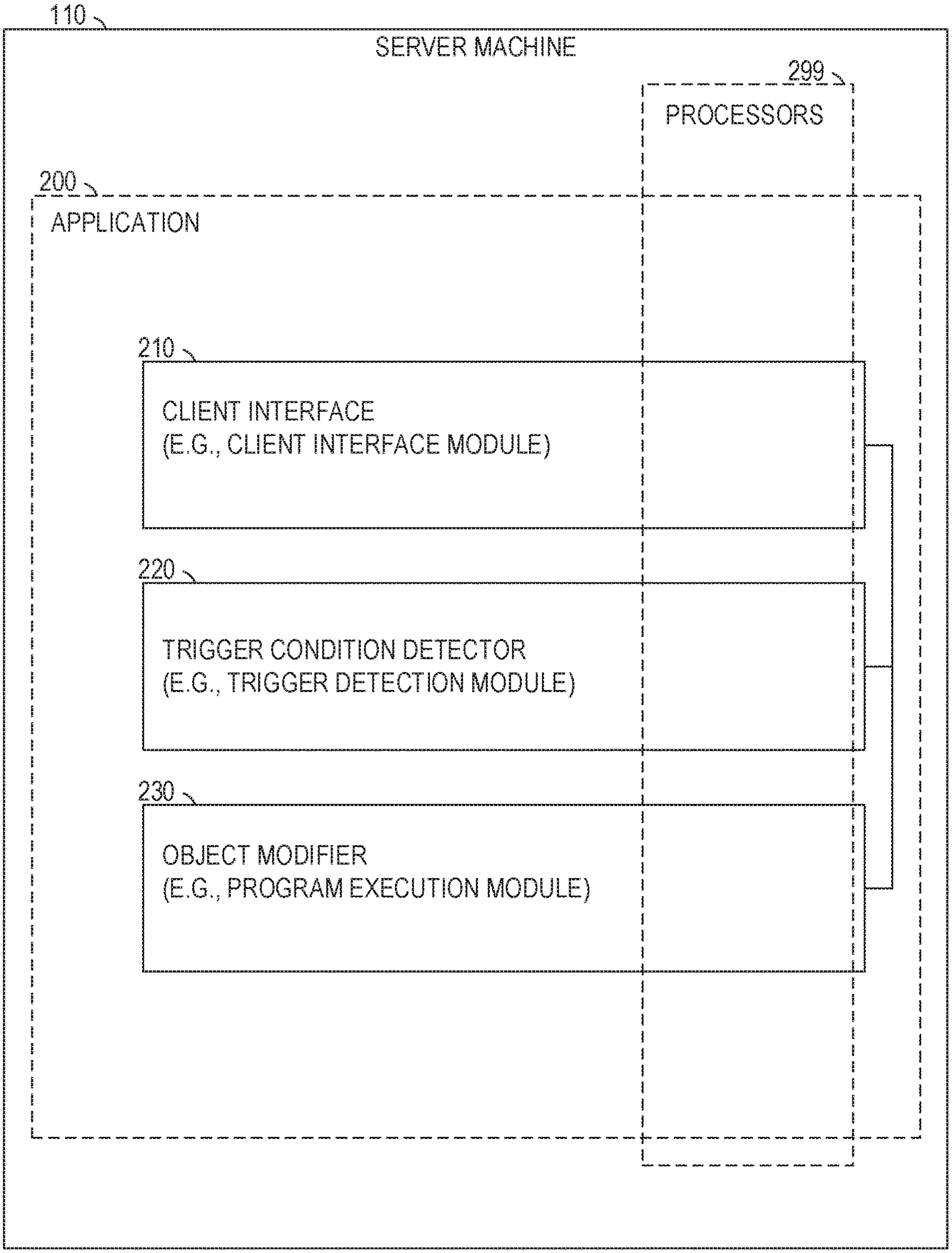
FIG. 2 is a block diagram illustrating components of a server machine suitable for facilitating conditional modification of an AR object, according to some example embodiments.

FIG. 2 is a block diagram illustrating components of the server machine 110, according to some example embodiments. The server machine 110 is shown as including a client interface 210, a trigger condition detector 220, and an object modifier 230, all configured to communicate with each other (e.g., via a bus, shared memory, or a switch). The client interface 210 may be or include a client interface module or similarly suitable software code configured to interface with one or more clients of the server machine 110 (e.g., one or more of the devices 130 and 150). The trigger condition detector 220 may be or include a trigger detection module or similarly suitable software code configured to detect one or more trigger conditions (e.g., a trigger condition for execution of a conditional modification program for an AR object). The object modifier 230 may be or include a program execution module or similarly suitable software code configured to execute a program (e.g., a conditional modification program for an AR object).

As shown in FIG. 2, the client interface 210, the trigger condition detector 220, the object modifier 230, or any suitable combination thereof, may form all or part of an application 200 (e.g., a server-side app or other server-executed program) that is stored (e.g., installed) on the server machine 110 (e.g., responsive to or otherwise as a result of data being received via the network 190). Furthermore, one or more processors 299 (e.g., hardware processors, digital processors, or any suitable combination thereof) may be included (e.g., temporarily or permanently) in the application 200, the client interface 210, the trigger condition detector 220, the object modifier 230, or any suitable combination thereof.

Any one or more of the components (e.g., modules) described herein may be implemented using hardware alone one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 3:
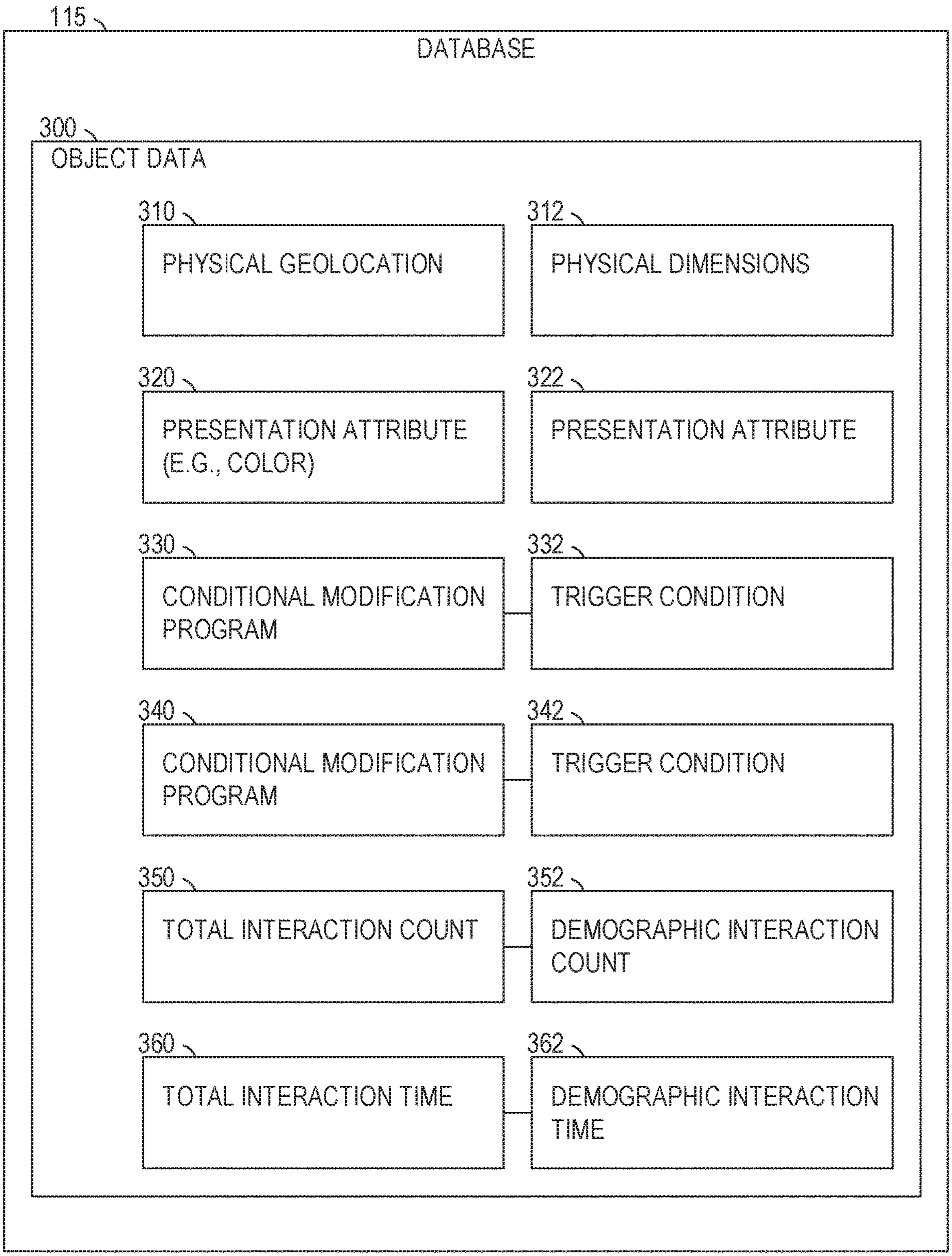
FIG. 3 is a block diagram illustrating components of a database suitable for facilitating conditional modification of an AR object, according to some example embodiments.

FIG. 3 is a block diagram illustrating components of the database 115, according to some example embodiments. The database 115 is shown as storing object data 300 of an AR object. The object data 300 corresponds to the AR object, defines the AR object, and specifies how the AR object is to be presented (e.g., visually, acoustically, or both) in an AR environment. Accordingly, one or more portions of the object data 300 may be considered as metadata of the AR object to which the object data 300 corresponds.

As shown in FIG. 3, the object data 300 specifies (e.g., by inclusion or by reference) one or more of various characteristics or other descriptors of the AR object. For example, the object data 300 is shown as specifying (e.g., by inclusion) a physical geolocation 310 of the AR object in the real world. In some example embodiments, the physical geolocation 310 is specified by global geolocation coordinates relative to the earth (e.g., a triplet of latitude, longitude, and altitude). In other example embodiments, the physical geolocation 310 is specified by relative geolocation coordinates relative to a room, a building, a landmark, or other suitable frame of reference. In some example embodiments, the physical geolocation 310 is treated as a type of presentation attribute for presenting the AR object.

The object data 300 may specify physical dimensions 312 of the AR object in the real world. The physical dimensions 312 may fully or partially define the size of the AR object, the shape of the AR object, the orientation of the AR object, or any suitable combination thereof. For example, the physical dimensions 312 may specify one or more linear dimensions (e.g., length, width, and height) of the AR object. In some example embodiments, the physical dimensions 312 are treated as presentation attributes for presenting the AR object.

The object data 300 may specify one or more presentation attributes 320 and 322 (e.g., additional presentation attributes beyond the physical geolocation 310 and the physical dimensions 312) of the AR object. A presentation attribute specifies how the AR object is to be presented (e.g., visually, acoustically, haptically, or any suitable combination thereof). Examples of a presentation attribute include a color of the AR object, a color pattern (e.g., chroma texture map) applied to the AR object, a brightness of the AR object, a brightness pattern (e.g., a luma texture map) applied to the AR object, a flash indicator of the AR object (e.g., to indicate whether the AR object should be displayed in a flashing state), a movement indicator of the AR object (e.g., to indicate whether the AR object should be displayed in a vertically bouncing state, horizontally jiggling state, or both), an audio file of the AR object (e.g., to be played when one or more users is physically within a threshold distance of the physical geolocation 310 of the AR object an audio volume of the AR object (e.g., to provide a basis for audio playback of the audio file of the AR object), or any suitable combination thereof.

The object data 300 may specify one or more pairs of conditional modification programs of the AR object, each with one or more corresponding trigger conditions for execution of that conditional modification program. FIG. 3 illustrates a conditional modification program 330 paired with a corresponding trigger condition 332, as well as another conditional modification program 340 paired with a corresponding trigger condition 342. Accordingly, if the trigger condition detector 220 (e.g., in the server machine 110) detects fulfillment of the trigger condition 332, the corresponding conditional modification program 330 is executed (e.g., by the object modifier 230 in the server machine 110). Similarly, if the trigger condition detector 220 detects fulfillment of the trigger condition 342, the corresponding conditional modification program 340 is executed.

According to some example embodiments, the object data 300 specifies a total interaction count 350, which may quantify (e.g., by enumerating) a total number of discrete user interactions experienced by the AR object. The total interaction count 350 may be paired with one or more corresponding demographic interaction counts. FIG. 3 illustrates the total interaction count 350 paired with a single corresponding demographic interaction count 352, though additional corresponding demographic interaction counts may also be included in the object data 300 and associated with (e.g., linked, mapped, or otherwise assigned to) the total interaction count 350. The demographic interaction count 352 may quantify a total number of discrete user interactions experienced by the AR object with users from a particular demographic group (e.g., defined by age, gender, education, occupation, favorite ice cream flavor, any other demographic descriptor, or any suitable combination thereof).

According to certain example embodiments, the object data 300 specifies a total interaction time 360, which may quantify (e.g., by valuing) a total amount of time during which the AR object experienced user interactions. The total interaction time 360 may be paired with one more corresponding demographic interaction times. FIG. 3 illustrates the total interaction time 360 being paired with a single corresponding demographic interaction time 362, though additional corresponding demographic interaction times may also be included in the object data 300 and associated with (e.g., linked, mapped, or otherwise assigned to) the total interaction time 360. The demographic interaction time 362 may quantify a total amount of time during which the object experienced user interactions with users from a particular demographic group (e.g., defined by age, gender, education, occupation, favorite ice cream flavor, any other demographic descriptor, or any suitable combination thereof).

Figure 4:
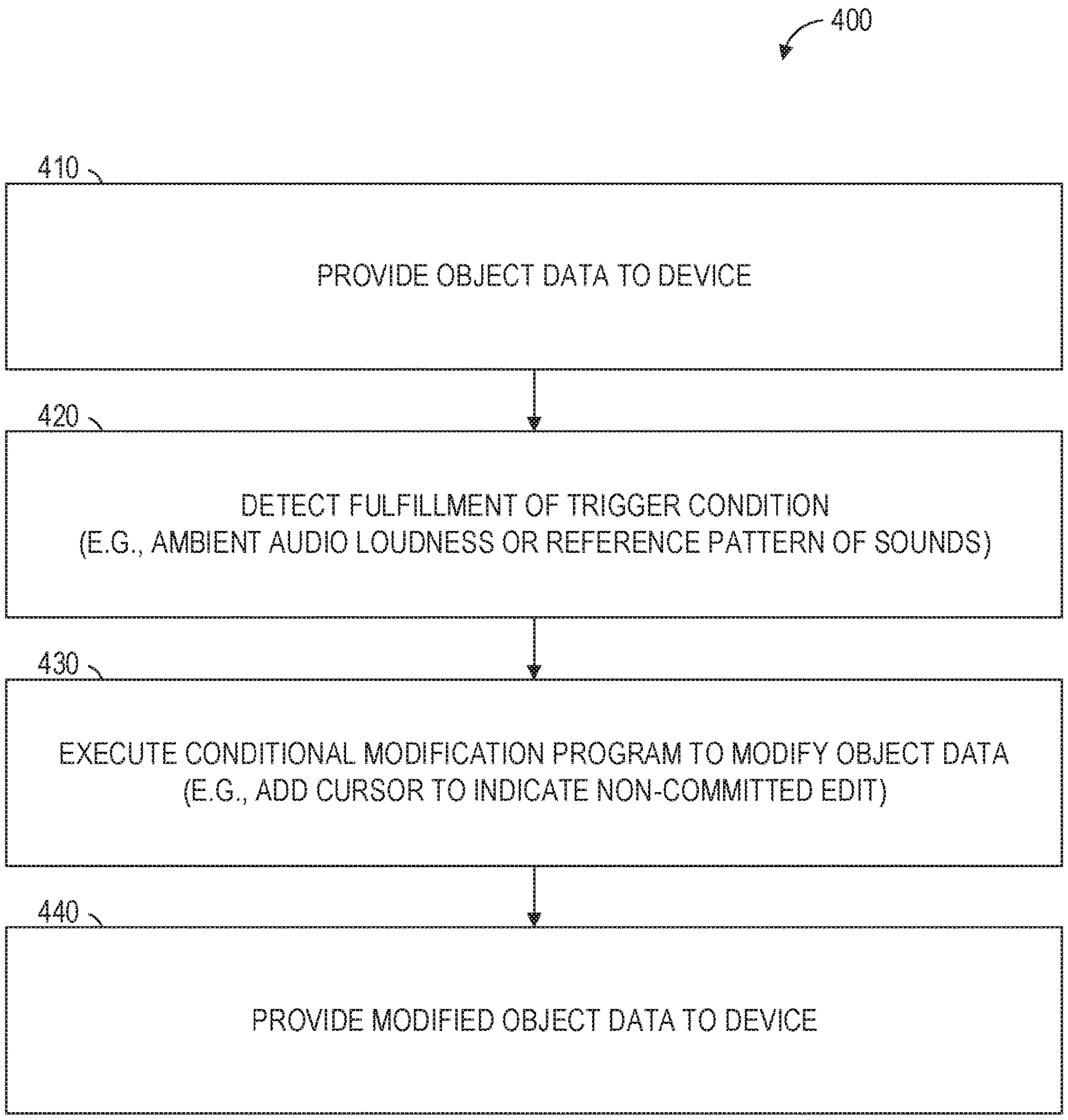
FIGS. 4-9 are flowcharts illustrating operations of the server machine in performing a method of conditionally modifying of an AR object, according to some example embodiments.

FIGS. 4-9 are flowcharts illustrating operations in performing a method 400 of conditionally modifying of an AR object, according to some example embodiments. For clarity and brevity, operations in the method 400 are presently described as being performed by the server machine 110, using components (e.g., modules) described above with respect to FIG. 2, using one or more processors (e.g., microprocessors or other hardware processors), or using any suitable combination thereof. However, in various example embodiments, the method 400 may be performed b device 130, alone or in conjunction with one or more other machines (e.g., the server machine 110, the database 115, or the device 150). As shown in FIG. 4, the method 400 includes operations 410, 420, 430, and 440.

In operation 410, the client interface 210 provides the object data 300 to the device 130. For example, the client interface 210 may retrieve the object data 300 from the database 115 and provide the object data 300 to the device 130 via the network 190. As another example, the client interface 210 may command or otherwise cause the database 115 to provide the Object data 300 to the device 130. As noted above, the object data 300 corresponds to an AR object and specifies, for example, the physical geolocation 310, the presentation attribute 320 (e.g., color or size), the conditional modification program 330, and the corresponding trigger condition 332. The object data 300 causes the device 130 to present (e.g., via a display screen or an AR headset) the AR object defined by the object data 300. In accordance with the provided object data 300, the device 130 presents the AR object at the physical geolocation 310 and with a first appearance (e.g., visual appearance, acoustic appearance, or both) specified by the object data 300 (e.g., specified by the presentation attribute 320).

In operation 420, the trigger condition detector 220 detects that the trigger condition 332 has been fulfilled. This may be performed by receiving an indicator or other signal from the client interface 210 (e.g., as a result of a status message being received by the client interface 210 via the network 190 from the device 130). As noted above, the trigger condition 332 corresponds to the conditional modification program 330, and the object data 300 of the AR object specifies that the trigger condition 332 is a trigger for executing the corresponding conditional modification program 330 to modify the AR Object.

To illustrate an example, suppose that the trigger condition 332 for executing the conditional modification program 330 specifies reception of an indication that a portion of the AR object is being edited. In this situation, the detecting in operation 420 that the trigger condition 332 has been fulfilled may, include receiving such an indication (e.g., from the device 130 via the network 190) that a portion of the AR object is being edited.

To illustrate another example, suppose that the trigger condition 332 for executing the conditional modification program 330 specifies a threshold level (e.g., a reference threshold level) of ambient audio loudness. In such a situation, the detecting in operation 420 that the trigger condition 332 has been fulfilled may include receiving an indication that a microphone of the device 130 has detected an actual level of ambient audio loudness that transgresses (e.g., meets or exceeds) the threshold level of ambient audio loudness.

To illustrate a further example, suppose that the trigger condition 332 specifies a reference pattern of sounds (e.g., clapping or a song, such as "The Star-Spangled Banner"). In such a situation, the detecting in operation 420 that the trigger condition 332 has been fulfilled may include receiving an indication that the microphone of the device 130 has captured an actual pattern of sounds that matches the reference pattern of sounds.

In operation 430, the object modifier 230 executes the conditional modification program 330 that corresponds to the trigger condition 332 that was detected to be fulfilled in operation 420. This is performed in response to the detected fulfillment of the trigger condition 332. Accordingly, the execution of the conditional modification program 330 modifies the object data 300 of the AR object and consequently modifies the AR object. For example, execution of the conditional modification program 330 may modify the object data 300 by modifying the presentation attribute 320 (e.g., color or size) within the object data 300. The modification of the object data 300 may occur within the database 115, within the server machine 110 (e.g., within a memory of the server machine 110), or within any suitable combination thereof.

To illustrate an example, suppose that that the trigger condition 332 for executing the conditional modification program 330 specifies reception of an indication that a portion of the AR object is being edited. In this situation, in response to a detection in operation 420 that the trigger condition 332 has been fulfilled, the executing of the conditional modification program 330 may add an AR cursor to the AR object in its second appearance, and the added AR cursor may indicate that the portion of the AR object is being edited. For example, the AR cursor may indicate a location of a non-committed edit to the AR object (e.g., an edit that is not yet saved or otherwise persistently incorporated into the object data 300 of the AR object).

In operation 440, the client interface 210 provides at least the modified portion of the object data 300 to the device 130.

For example, the entirety of the modified object data 300 may be communicated to the device 130 via the network 190, or the modified presentation attribute 320 (e.g., size or color of the AR object) may be communicated to the device 130 via the network 190. In some example embodiments, the modified object data 300 is stored in the database 115, and the client interface 210 commands or otherwise causes the device 130 to retrieve at least the modified portion (e.g., the modified presentation attribute 320) of the object data 300 via the network 190. The modified object data 300 causes the device 130 to present (e.g., via a display screen or an AR headset) the AR object in modified form, as modified in accordance with a modified object data 300. Thus, in accordance with the modified object data 300, the device 130 presents the AR object with a second appearance specified by the modified object data 300 (e.g., specified by the modified presentation attribute 320).

For example, the presentation attribute modified in operation 430 (e.g., presentation attribute 320 or physical dimensions 312) may specify a physical dimension (e.g., length, width, height, depth, thickness, or any suitable combination thereof) of the AR object, and that physical dimension may fully or partially determine the real-world size of the AR object. Accordingly, the executing of the conditional modification program 330 in operation 430 may modify this physical dimension of the AR object and consequently alter the real-world size of the AR object, as presented with its second appearance.

As another example, the presentation attribute modified in operation 430 (e.g., presentation attribute 320) may specify a color (e.g., hue, saturation, brightness, or any suitable combination thereof) of at least a portion of the AR object. Accordingly, the executing of the conditional modification program 330 in operation 430 may modify this color of the AR object and consequently alter the color of at least a portion of the AR object, as presented with its second appearance.

As a further example, the presentation attribute modified in operation 430 (e.g., presentation attribute 320 or physical geolocation 310) may specify the physical geolocation of the AR object in the real world, and that physical geolocation may fully or partially determine the real-world geolocation of the AR object. Accordingly, the executing of the conditional modification program 330 in operation 430 may modify this real-world geolocation of the AR object and consequently alter where the AR object is presented relative to the real world, in accordance with its second appearance.

Figure 5:
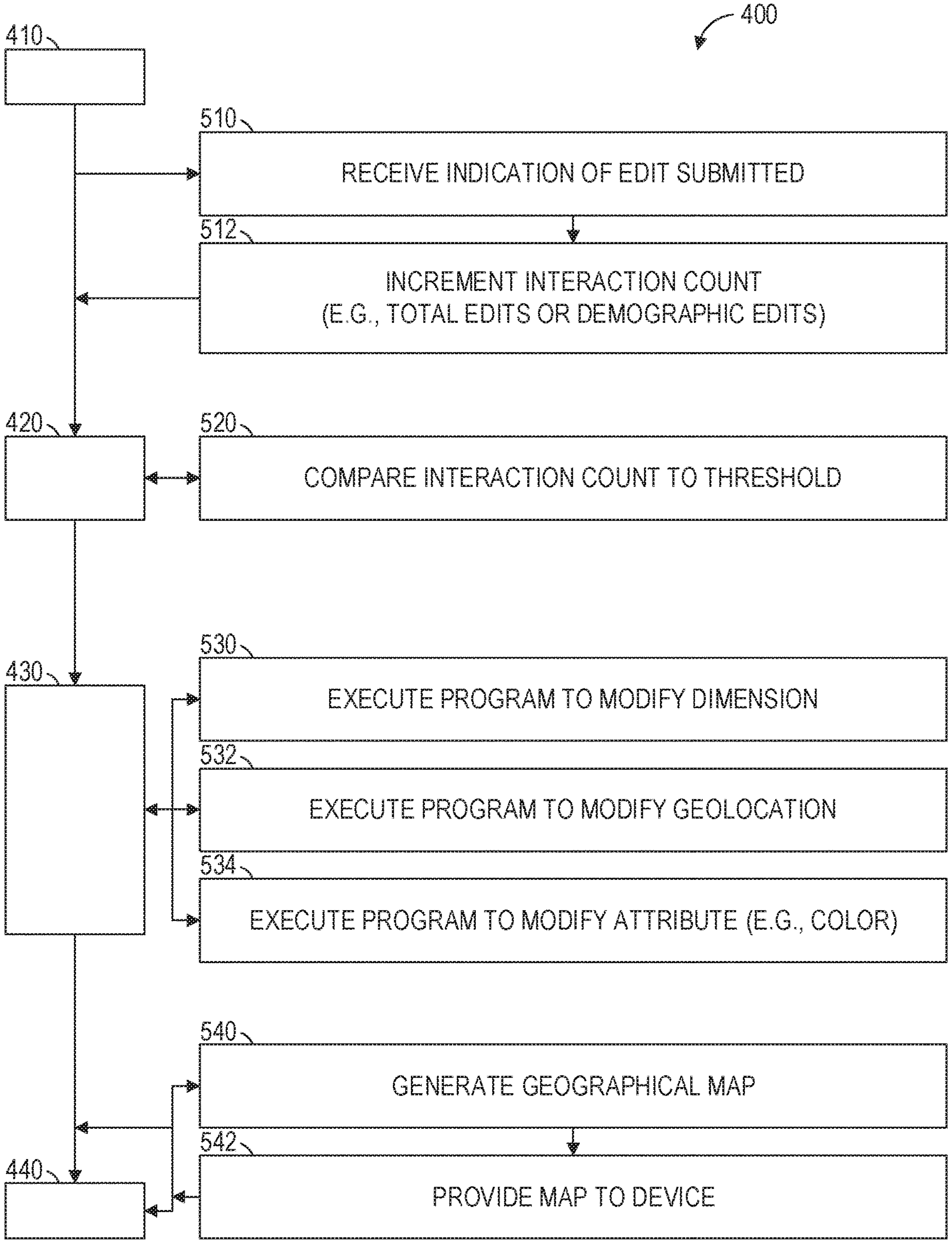

As shown in FIG. 5, in addition to any one or more of the operations previously described, the method 400 may include one or more of operations 510, 512, 520, 530, 532, 534, 540, and 542. According to some example embodiments, operations 510 and in 512 are performed prior to operation 420, in which the trigger condition detector 220 detects fulfillment of the trigger condition 332.

In operation 510, the client interface 210 receives an indication that the device 130 submitted an edit to the AR object (e.g., an edit in the form of a newly added portion, removal of an existing portion, or modification to an existing portion of the AR object). For example, the client interface 210 may receive a request that an edit be performed on the AR object (e.g., stored in the object data 300 or otherwise persistently incorporated into the definition of the AR object), and such a request may be received by the network 190 from the device 130. In some example embodiments, the received indication also refers to a user profile (e.g., stored by the device 130, the server machine 110, the database 115, or any suitable combination thereof) that describes the user 132 and indicates that the user 132 belongs to a particular demographic group (e.g., single women between ages 25 and 40 whose favorite ice cream flavor is chocolate).

In operation 512, the client interface 210 increments an interaction count that corresponds to the AR object (e.g., the total interaction count 350, the demographic interaction count 352, or both), in response to the indication received in operation 510. For example, the client interface 210 may increment the total interaction count 350 that corresponds to the AR object. As another example, if the received indication in operation 510 indicates that the user 132 is a member of a particular demographic group (e.g., single women between 25 and 40 whose favorite ice cream flavor is chocolate), the demographic interaction count for that particular demographic group (e.g., demographic interaction count 352) may be incremented by the client interface 210. In such a situation, the total interaction count 350 may also be incremented as well (e.g., to tally user interactions of multiple kinds, from multiple demographic groups, or both).

In example embodiments that include operation 512, operation 520 may be performed as part (e.g., a precursor task, a subroutine, or a portion) of operation 420, in which the trigger condition detector 220 detects fulfillment of the trigger condition 332. In operation 520, the trigger condition detector 220 performs a comparison of the interaction count (e.g., the total interaction count 350 or the demographic interaction count 352) incremented in operation 512 to a corresponding threshold interaction count (e.g., a predetermined total interaction count or a predetermined demographic interaction count, either of which may be a maximum interaction count or a minimum interaction count).

Accordingly, the detection of the fulfillment of the trigger condition 332 in operation 420 may be based on the comparison performed in operation 520. For example, if the total interaction count 350 was incremented in operation 512, the trigger condition detector 220 may compare the total interaction count 350 to a reference total interaction count (e.g., a maximum interaction count of all types and from all users). As another example, if the demographic interaction count 352 was incremented in operation 512, the trigger condition detector 220 may compare the demographic interaction count 352 to a reference demographic interaction count (e.g., a maximum interaction count or a minimum interaction count for that demographic group).

As shown in FIG. 5, one or more of operations 530, 532, and 534 may be performed as part of operation 430, in which the object modifier 230 executes the conditional modification program 330 to modify the object data 300 of the AR object. In operation 530, the object modifier 230 modifies a physical dimension (e.g., as specified by the presentation attribute 320 or the physical dimensions 312) of the AR object by executing the conditional modification program 330. As noted above, this may have the effect of altering the real-world size of the AR object, as presented with its second appearance.

In operation 532, the object modifier 230 modifies the physical geolocation (e.g., specified by the presentation attribute 320 or the physical geolocation 310) of the AR object by executing the conditional modification program 330. As noted above, this may have the effect of altering where the AR object is presented relative to the real world, according to its second appearance.

In operation 534, the object modifier 230 modifies a presentation attribute (e.g., specified by the presentation attribute 320, which may, for example, specify color) of the AR object by executing the conditional modification program 330. As noted above, this may have the effect of altering the appearance of the AR object from its first appearance to its second appearance.

As shown in FIG. 5, one or more of operations 540 and 542 may be performed after operation 430, in which the object modifier 230 executes the conditional modification program 330 to modify the object data 300 of the AR object. In operation 540, the client interface 210 generates a geographical map (e.g., a map that illustrates roads and landmarks within a geographical area, such as a city). The geographical map includes a depiction or other representation (e.g., symbolic representation) of the AR object and indicates the physical geolocation 310 of the AR object. In addition, the depiction or other representation may have a color that indicates a frequency (e.g., averaging five times a day, twice a week, or once a month) or range of frequencies at which the AR object is edited (e.g., by user interactions). For example, a gray depiction may indicate that the AR object is edited by users less than once a week, while a blue depiction may indicate that the AR object is edited by users more than once a week.

In operation 542, the client interface 210 provides the geographical map generated in operation 540 to one or more devices. For example, the geographical map may be provided to the device 150 (e.g., as a guide for the user 152 to locate the AR object for further interaction, such as editing). Accordingly, the color of the depiction of the AR object within the provided geographical map can notify the user 152 of how often the AR object is edited.

Figure 6:
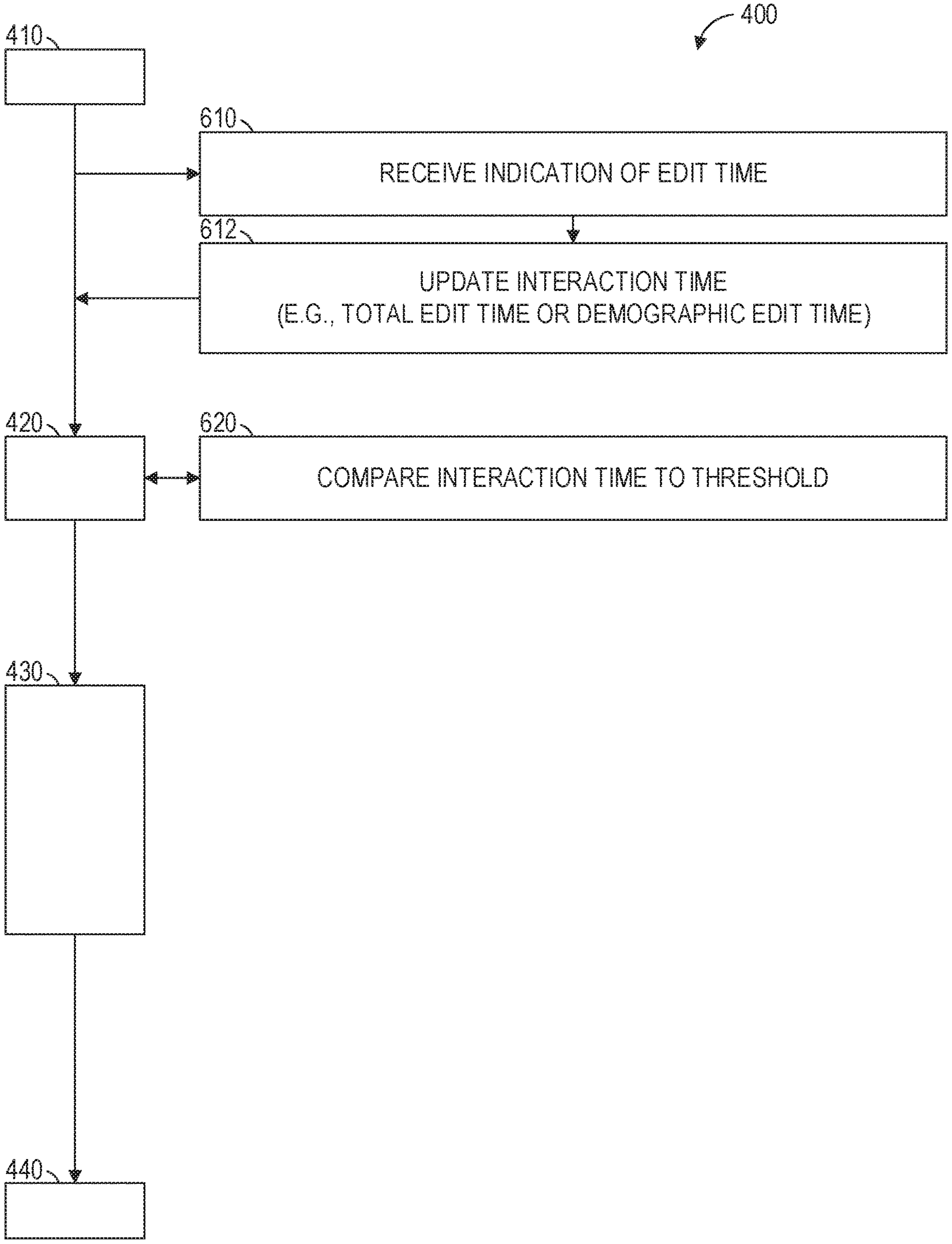

As shown in FIG. 6, in addition to any one or more of the operations previously described, the method 400 may include one or more of operations 610, 612, and 620. According to some example embodiments, operation 610 and 612 are performed prior to operation 420, in which the trigger condition detector 220 detects fulfillment of the trigger condition 332.

In operation 610, the client interface 210 receives an indication that the device 130 has been editing the AR object or has edited the AR object for a period of time (e.g., a period of time during which the AR object has been kept in an editing state or other edit-accepting state). For example, the client interface 210 may receive a request that the AR object be unlocked for editing (e.g., with write-permissions for the object data 300 that defines the AR object), and such a request may be received by the network 190 from the device 130. In some example embodiments, the received indication also refers to a user profile (e.g., stored by the device 130, the server machine 110, the database 115, or any suitable combination thereof) that describes the user 132 and indicates that the user 132 belongs to a particular demographic group (e.g., married men between ages 40 and 55 whose favorite ice cream flavor is vanilla).

In operation 612, the client interface 210 updates an interaction time that corresponds to the AR object (e.g., the total interaction time 360, the demographic interaction time 362, or both), in response to the indication received in operation 610. For example, the client interface 210 may update the total interaction time 360 that corresponds to the AR object. As another example, if the received indication in operation 610 indicates that the user 132 is a member of a particular demographic group (e.g., married men between 40 and 55 whose favorite ice cream flavor is vanilla), the demographic interaction time for that particular demographic group (e.g., demographic interaction time 362) may be updated by the client interface 210. In such a situation, the total interaction time 360 may also be incremented as well (e.g., to track cumulative user interaction times from multiple demographic groups).

In example embodiments that include operation 612, operation 620 may be performed as part of operation 420, in which the trigger condition detector 220 detects fulfillment of the trigger condition 332. In operation 620, the trigger condition detector 220 performs a comparison of the interaction time (e.g., the total interaction time 360 or the demographic interaction time 362) updated in operation 512 to a corresponding threshold interaction time (e.g., a predetermined total interaction time or a predetermined demographic interaction time, either of which may be a maximum interaction time or a minimum interaction time).

Accordingly, the detection of the fulfillment of the trigger condition 332 in operation 420 may be based on the comparison performed in operation 620. For example, if the total interaction time 360 was updated in operation 612, the trigger condition detector 220 may compare the total interaction time 360 to a reference total interaction time (e.g., a maximum interaction time for all users). As another example, if the demographic interaction time 362 was updated in operation 612, the trigger condition detector 220 may compare the demographic interaction time 362 to a reference demographic interaction time (e.g., a maximum interaction time or a minimum interaction time for that demographic group).

Figure 7:
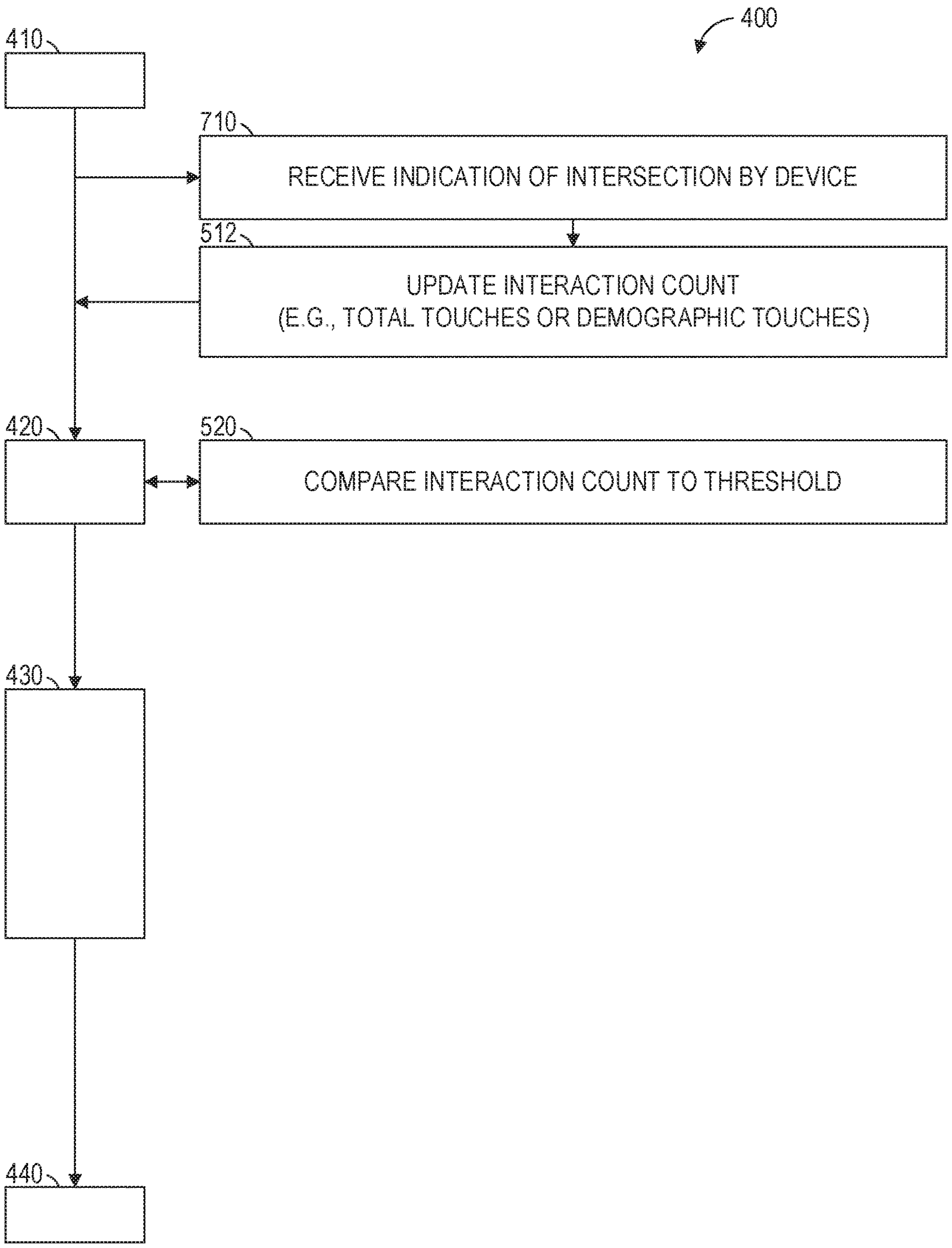

As shown in FIG. 7, in addition to any one or more of the operations previously described, the method 400 may include one or more of operations 710, 512, and 520, the latter two of which have been previously described. According to some example embodiments, operations 710 and in 512 are performed prior to operation 420, in which the trigger condition detector 220 detects fulfillment of the trigger condition 332.

In operation 710, the client interface 210 receives an indication that the device 130 has intersected the AR object (e.g., an indication that the geolocation of the device 130 has coincided with the physical geolocation 310 of the AR object or has been encompassed by an outer surface of the AR object, as defined by the physical dimensions 312 of the AR object). For example, the client interface 210 may receive such an indication in the form of geolocation data of the device 130, which geolocation data may be received by the network 190 from the device 130. In some example embodiments, the received indication also refers to a user profile (e.g., stored by the device 130, the server machine 110, the database 115, or any suitable combination thereof) that describes the user 132 and indicates that the user 132 belongs to a particular demographic group (e.g., married women between ages 55 and 70 whose favorite ice cream flavor is coffee).

As noted above, in operation 512, the client interface 210 increments an interaction count that corresponds to the AR object (e.g., the total interaction count 350, the demographic interaction count 352, or both). This may be performed in response to the indication received in operation 710. For example, the client interface 210 may increment the total interaction count 350 that corresponds to the AR object. As another example, if the received indication in operation 710 indicates that the user 132 is a member of a particular demographic group (e.g., married women between 55 and 70 whose favorite ice cream flavor is coffee), the demographic interaction count for that particular demographic group (e.g., demographic interaction count 352) may be incremented by the client interface 210. In such a situation, the total interaction count 350 may also be incremented as well (e.g., to tally user interactions of multiple kinds, from multiple demographic groups, or both).

As noted above, in example embodiments that include operation 512, operation 520 may be performed as part (e.g., a precursor task, a subroutine, or a portion) of operation 420, in which the trigger condition detector 220 detects fulfillment of the trigger condition 332. In operation 520, the trigger condition detector 220 performs a comparison of the interaction count (e.g., the total interaction count 350 or the demographic interaction count 352) incremented in operation 512 to a corresponding threshold interaction count (e.g., a predetermined total interaction count or a predetermined demographic interaction count, either of which may be a maximum interaction count or a minimum interaction count).

Accordingly, the detection of the fulfillment of the trigger condition 332 in operation 420 may be based on the comparison performed in operation 520. For example, if the total interaction count 350 was incremented in operation 512, the trigger condition detector 220 may compare the total interaction count 350 to a reference total interaction count (e.g., a maximum interaction count of all types and from all users). As another example, if the demographic interaction count 352 was incremented in operation 512, the trigger condition detector 220 may compare the demographic interaction count 352 to a reference demographic interaction count (e.g., a maximum interaction count or a minimum interaction count for that demographic group).

Figure 8:
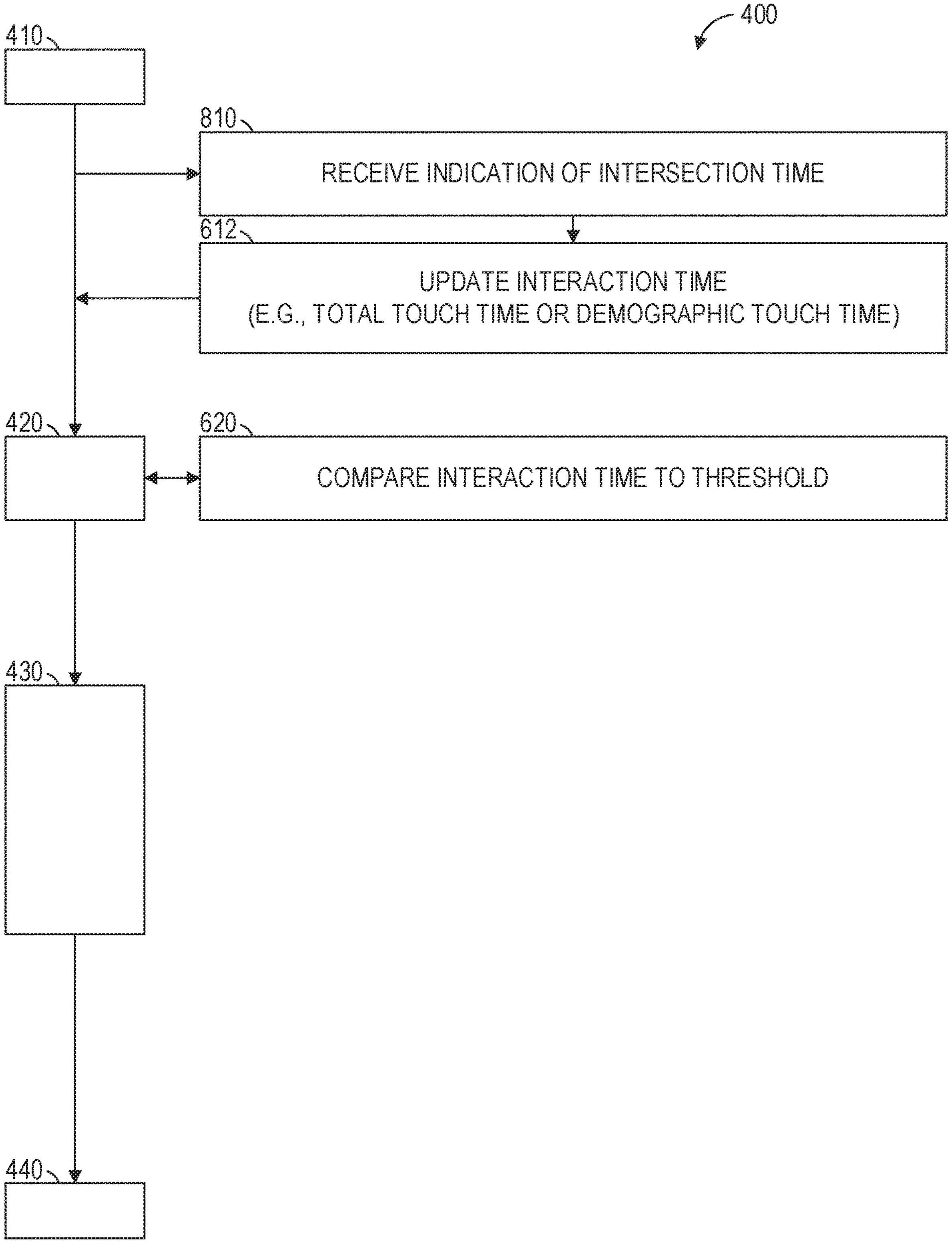

As shown in FIG. 8, in addition to any one or more of the operations previously described, the method 400 may include one or more of operations 810, 612, and 620, the latter two of which have been previously described. According to some example embodiments, operation 810 and 612 are performed prior to operation 420, in which the trigger condition detector 220 detects fulfillment of the trigger condition 332.

In operation 810, the client interface 210 receives an indication that the device 130 has been intersecting the AR object or has intersected the AR object for a period of time (e.g., a period of time during which the geolocation of the device 130 has coincided with the physical geolocation 310 of the AR object or has been encompassed by an outer surface of the AR object, as defined by the physical dimensions 312 of the AR object). For example, the client interface 210 may receive a status message indicating a running tally of intersection time, and such a status message may be received by the network 190 from the device 130. In some example embodiments, the received indication also refers to a user profile (e.g., stored by the device 130, the server machine 110, the database 115, or any suitable combination thereof) that describes the user 132 and indicates that the user 132 belongs to a particular demographic group (e.g., married men between ages 40 and 55 whose favorite ice cream flavor is vanilla).

As noted above, in operation 612, the client interface 210 updates an interaction time that corresponds to the AR object (e.g., the total interaction time 360, the demographic interaction time 362, or both). This may be performed in response to the indication received in operation 810. For example, the client interface 210 may update the total interaction time 360 that corresponds to the AR object. As another example, if the received indication in operation 810 indicates that the user 132 is a member of a particular demographic group (e.g., married women between 55 and 70 whose favorite ice cream flavor is coffee), the demographic interaction time for that particular demographic group (e.g., demographic interaction time 362) may be updated by the client interface 210. In such a situation, the total interaction time 360 may also be incremented as well (e.g., to track cumulative user interaction times from multiple demographic groups).

As noted above, in example embodiments that include operation 612, operation 620 may be performed as part of operation 420, in which the trigger condition detector 220 detects fulfillment of the trigger condition 332. In operation 620, the trigger condition detector 220 performs a comparison of the interaction time (e.g., the total interaction time 360 or the demographic interaction time 362) updated in operation 512 to a corresponding threshold interaction time (e.g., a predetermined total interaction time or a predetermined demographic interaction time, either of which may be a maximum interaction time or a minimum interaction time).

Accordingly, the detection of the fulfillment of the trigger condition 332 in operation 420 may be based on the comparison performed in operation 620. For example, if the total interaction time 360 was updated in operation 612, the trigger condition detector 220 may compare the total interaction time 360 to a reference total interaction time (e.g., a maximum interaction time for all users). As another example, if the demographic interaction time 362 was updated in operation 612, the trigger condition detector 220 may compare the demographic interaction time 362 to a reference demographic interaction time (e.g., a maximum interaction time or a minimum interaction time for that demographic group).

Figure 9:
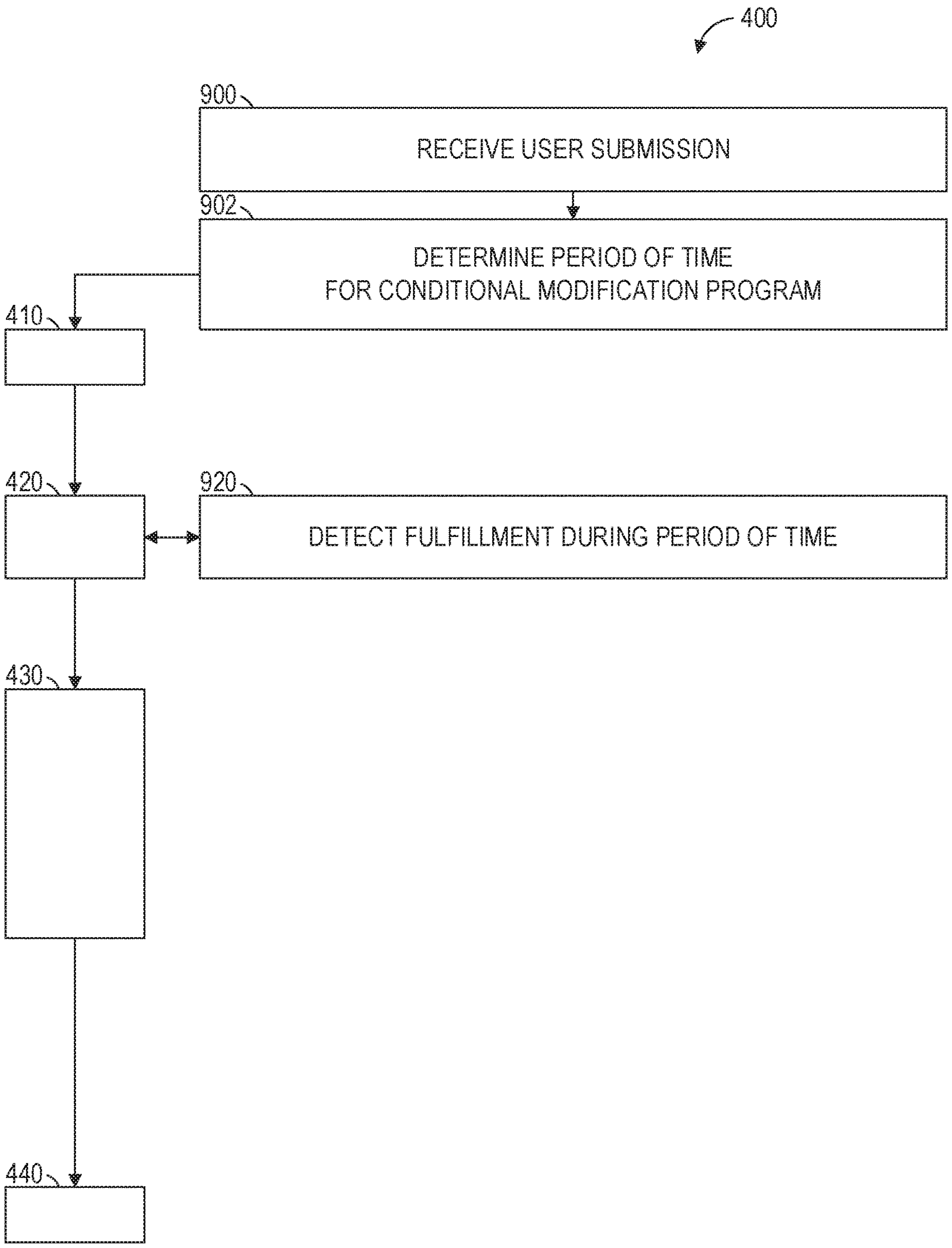

As shown in FIG. 9, in addition to any one or more of the operations previously described, the method 400 may include one or more of operations 900, 902, and 920. FIG. 9 illustrates operations 900 and 902 being performed prior to operation 410, in which the client interface 210 provides the object data 300 of the AR object to the device 130.

In operation 900, the client interface 210 receives a user submission that includes or otherwise identifies (e.g., by reference) the conditional modification program 330. That is, the conditional modification program 330 may be user-submitted (e.g., by the user 132 or by the user 152). Thus, the client interface 210 may receive the user submission (e.g., within a request or other message) via the network 190 from the device 130 or from the device 150. The user submission may also include the corresponding trigger condition 332 for execution of the conditional modification program 330. In some example embodiments, the user submission further includes a corresponding value accorded to the conditional modification program 330 (e.g., a value that indicates a bid or fee paid for incorporating the submitted conditional modification program 330 into the object data 300 of the AR object).

In operation 902, the client interface 210 determines a period of time during which the submitted conditional modification program 330 is to be specified (e.g., by inclusion or by reference) by the object data 300 that defines the AR object. In some example embodiments, this may be performed based on (e.g., in response to) the value accorded to the conditional modification program 330. For example, the user 152 may have paid a fee to have the submitted conditional modification program 330 temporarily incorporated into the object data 300 of the AR object, and this fee may be reflected in the submission received in operation 900. Accordingly, the client interface 210 may determine (e.g., via a lookup table stored by the database 115) a time period that corresponds to the amount of the fee paid, such that the client interface 210 can add the conditional modification program 330 and its trigger condition 332 to the object data 300 during the time period, and then remove the conditional modification program 330 and its trigger condition 332 from the object data 300 after expiration of the time period.

In example embodiments that include operation 902, operation 920 may be performed as part of operation 420, in which the trigger condition detector 220 to detect fulfillment of the trigger condition 332. In operation 920, the trigger condition detector 220 detects the fulfillment of the trigger condition 332 during the period of time that was determined in operation 902 for the corresponding conditional modification program 330.

According to various example: embodiments, one or more of the methodologies described herein may facilitate conditional modification of an AR object. Moreover, one or more of the methodologies described herein may facilitate dynamic behavior of the AR object in response to one or more of various user interactions, cumulative user interactions, or both. In addition, one or more of the methodologies described herein are operable to improve the variety of interactive experiences provided by an AR object, including support of user-submitted conditional modification programs and corresponding trigger conditions. Hence, one or more of the methodologies described herein may facilitate provision of crowd-sourced creative experiences with one or more AR objects, as well as regularly refreshed or updated AR content that is more resistant to loss of user interest or user engagement, compared to capabilities of pre-existing systems and methods.

When these effects are considered in aggregate, one or more of the methodologies described herein may obviate a need for certain efforts or resources that otherwise would be involved in conditional modification of an AR object. Efforts expended by a user in configuring sophisticated conditional modifications to an AR object may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 10:
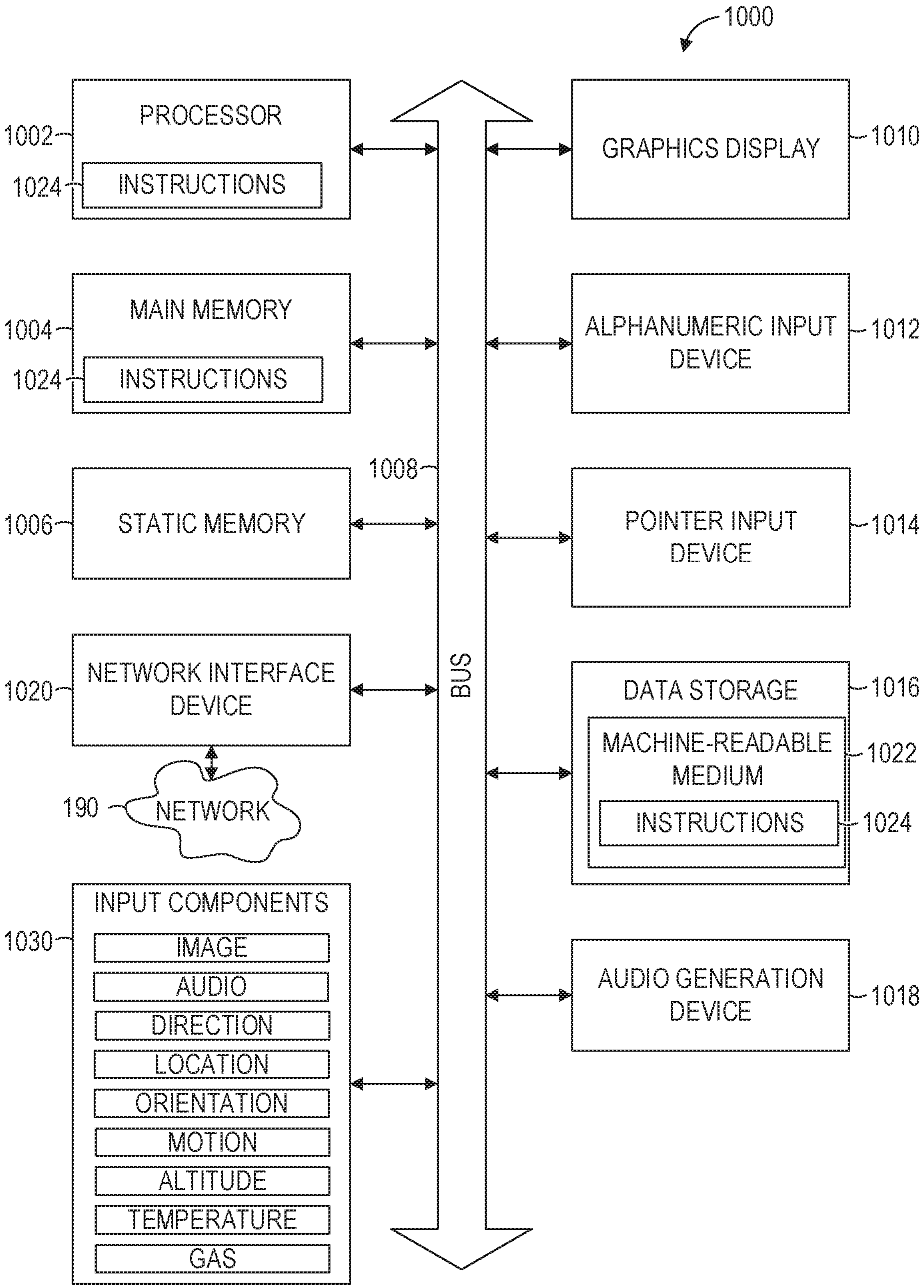
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer) within which the instructions 1024 (e.g., software, a program, an application, an applet, an app, or other executable code) for causing the machine 1000 to perform any one or more of the methodologies discussed herein may be executed, in whole or in part.

In alternative embodiments, the machine 1000 operates as a standalone device or may be communicatively coupled (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include any collection of machines that individually or jointly execute the instructions 1024 to perform all or part of any one or more of the methodologies discussed herein.

The machine 1000 includes a processor 1002 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1004, and a static memory 1006, which are configured to communicate with each other via a bus 1008. The processor 1002 contains solid-state digital microcircuits (e.g., electronic, optical, or both) that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein. In some example embodiments, the processor 1002 is a multi core CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1000 with at least the processor 1002, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a pointer input device 1014 (e.g., a mouse, a touchpad, a touchscreen, a trackball, a joystick, a stylus, a motion sensor, an eye tracking device, a data glove, or other pointing instrument), a data storage 1016, an audio generation device 1018 (e.g., a sound card, an amplifier, a speaker, a headphone jack, or any suitable combination thereof), and a network interface device 1020.

The data storage 1016 (e.g., a data storage device) includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1004, within the static memory 1006, within the processor 1002 (e.g., within the processor's cache memory), or any suitable combination thereof, before or during execution thereof by the machine 1000. Accordingly, the main memory 1004, the static memory 1006, and the processor 1002 may be considered machine-readable media (e.g., tangible and non-transitory machine-readable media). The instructions 1024 may be transmitted or received over the network 190 via the network interface device 1020. For example, the network interface device 1020 may communicate the instructions 1024 using any one or more transfer protocols (e.g., hypertext transfer protocol (HTTP)).

In some example embodiments, the machine 1000 may be a portable computing device (e.g., a smart phone, a tablet computer, or a wearable device) and may have one or more additional input components 1030 (e.g., sensors or gauges), Examples of such input components 1030 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component e.g., an altimeter), a temperature input component (e.g., a thermometer), and a gas detection component (e.g., a gas sensor). Input data gathered by any one or more of these input components 1030 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 1024 for execution by the machine 1000 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 1024).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module, Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially, processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Figure 11:
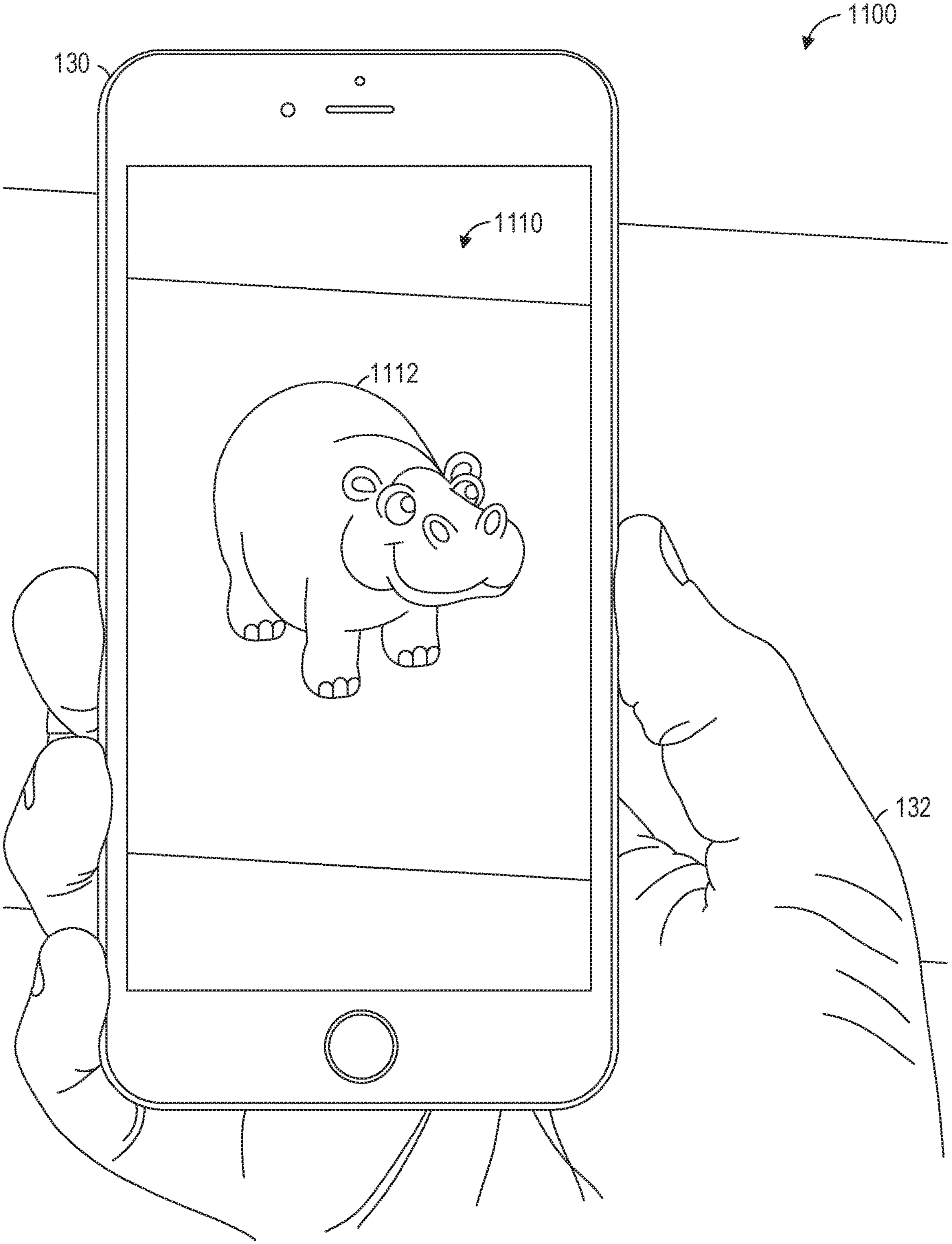
FIG. 11 and FIG. 12 are diagrams illustrating screenshots of an AR object before and after conditional modification of the AR object, according to some example embodiments.
Figure 12:
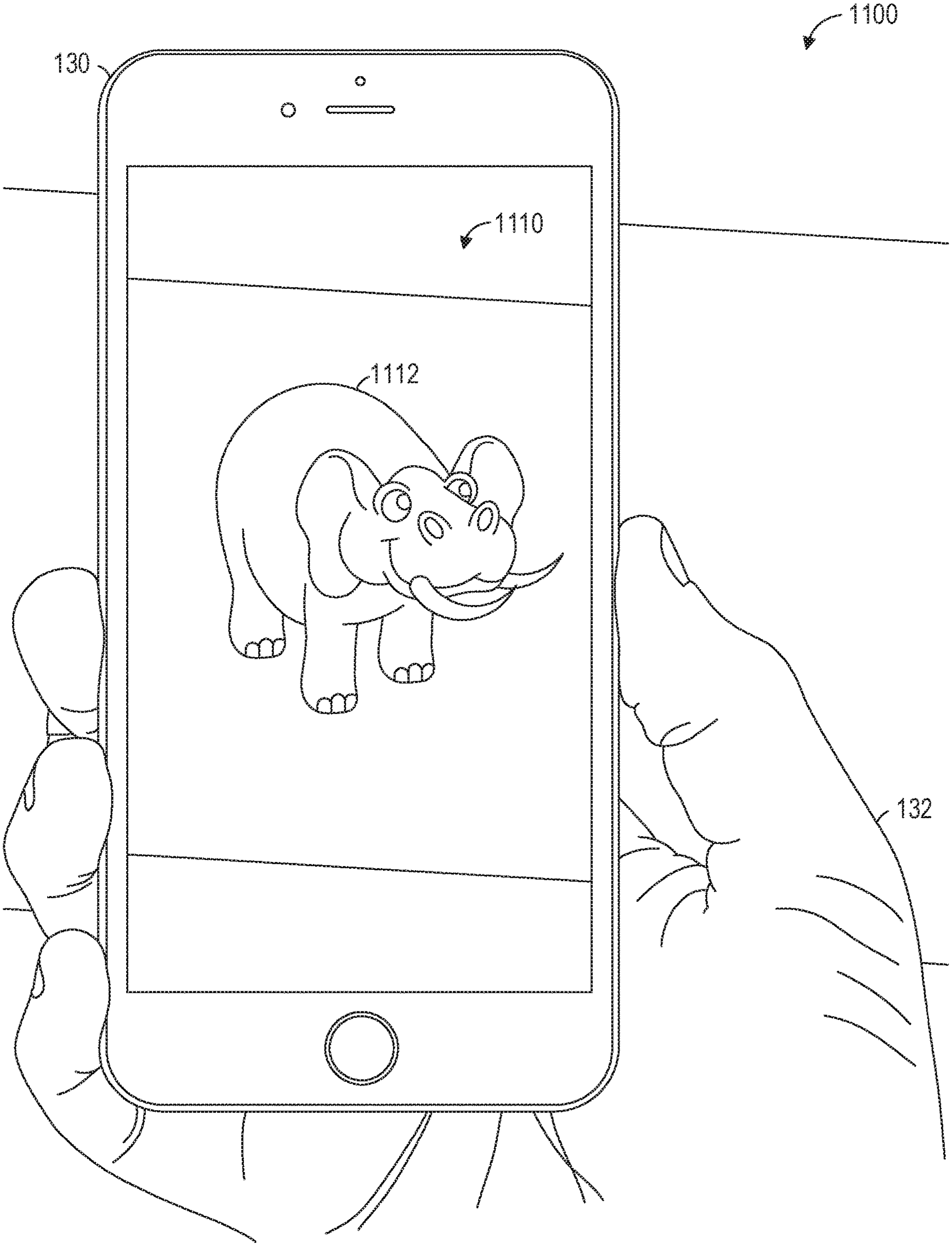

FIG. 11 and FIG. 12 are diagrams illustrating screenshots of an AR object 1112 before and after conditional modification of the AR object 1112, according to some example embodiments. As shown in FIG. 11, the device 130 is being used by the user 132 in a real-world scene 1100 and a camera of the device 130 is capturing a view of the real world scene 1100. In addition, a display screen of the device 130 depicts an AR scene 1110 that combines the real world scene 1100 with the AR object 1112. Specifically, the AR object 1112 is depicted with a pre-modification (e.g., first) appearance (e.g., a miniature hippopotamus), in accordance with its defining object data (e.g., object data 300) prior to the modification process described above.

As shown in FIG. 12, the display screen of the device 130 continues to detect the AR scene 1110, and the AR scene 1110 continues to combine the real world scene 1100 with the AR object 1112, However, the AR object 1112 is now depicted with a post-modification (e.g., second) appearance (e.g., a miniature hippopotamus with elephant ears and elephant tusks) in accordance with its defining object data (e.g., object data 300) after the modification process described above.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems (e.g., machines, devices, or other apparatus) discussed herein.

A first example provides a method comprising:

providing, to a user device and by one or more processors of a machine, object data that defines an augmented reality (AR) object, the object data of the AR object specifying a physical geolocation of the AR object, a presentation attribute of the AR object, a conditional modification program of the AR object, and a trigger condition for execution of the conditional modification program, the provided object data causing the user device to present the AR object with a first appearance and located at the physical geolocation;

detecting, by one or more processors of the machine, fulfillment of the trigger condition specified by the object data for execution of the conditional modification program of the AR object;

based on the detected fulfillment of the trigger condition and by one or more processors of the machine, executing the conditional modification program of the AR object, the executing of the conditional modification program modifying the object data of the AR object by modifying the presentation attribute of the AR object; and providing, to the user device and by one or more processors of the machine, the modified object data of the AR object, the modified object data causing the user device to present the AR object with a second appearance based on the modified presentation attribute of the AR object.

A second example provides a method according to the first example, wherein:

the presentation attribute of the AR object specifies a physical dimension of the AR object; and the executing of the conditional modification program modifies the physical dimension of the AR object, the second appearance of the AR object differing in size from the first appearance of the AR object.

A third example provides a method according to the first example or the second example, wherein:

the presentation attribute of the AR object specifies a color of at least a portion of the AR object; and the executing of the conditional modification program modifies a color of the portion of the AR object, the second appearance of the AR object at least partially differing in color from the first appearance of the AR object.

A fourth example provides a method according to any of the first through third examples, wherein:

the presentation attribute of the AR object specifies the physical geolocation of the AR object; and the executing of the conditional modification program modifies the physical geolocation of the AR object; the second appearance of the AR object differing in physical geolocation from the first appearance of the AR object.

A fifth example provides a method according to any of the first through fourth examples, further comprising:

receiving an indication that the user device submitted an edit to the AR object; and in response to the received indication, incrementing an interaction count that corresponds to the AR object; and wherein:

the detecting of the fulfillment of the trigger condition is based on a comparison of the incremented interaction count to a threshold interaction count.

A sixth example provides a method according to any of the first through fifth examples, further comprising:

receiving an indication that the user device edited the AR object for a period of time; and in response to the received indication; updating a total interaction time that corresponds to the AR object based on the period of time; and wherein:

the detecting of the fulfillment of the trigger condition is based on a comparison of the updated total interaction time to a threshold total interaction time.

A seventh example provides a method according to any of the first through sixth examples, further comprising:

receiving an indication that a device geolocation of the user device intersected the AR object; and in response to the received indication, incrementing an interaction count that corresponds to the AR object; and wherein:

the detecting of the fulfillment of the trigger condition is based on a comparison of the incremented interaction count to a threshold interaction count.

An eighth example provides a method according to any of the first through seventh examples, further comprising:

receiving an indication that the user device edited the AR object and corresponds to a user profile that specifies a demographic descriptor of a user of the user device; and in response to the received indication, incrementing an interaction count that corresponds to the AR object and corresponds to the demographic descriptor; and wherein:

the detecting of the fulfillment of the trigger condition is based on a comparison of the incremented interaction count to a threshold interaction count.

A ninth example provides a method according to any of the first through eighth examples, further comprising:

receiving an indication that the user device edited the AR object; and in response to the received indication, incrementing an interaction count that corresponds to the AR object; and generating a geographical map that includes a depiction of the edited AR object, the depiction having a color that indicates a frequency at which the AR object is edited.

A tenth example provides a method according to the ninth example, wherein:

the user device is a first user device; and the method further comprises:

providing the generated geographical map to a second user device, the provided geographical map including the depiction whose color indicates the frequency at which the AR object is edited.

An eleventh example provides a method according to any of the first through tenth examples, further comprising:

receiving a user submission that includes the conditional modification program, the trigger condition for execution of the conditional modification program, and a corresponding value accorded to the conditional modification program; and based on the value accorded to the conditional modification program, determining a period of time during which the conditional modification program is to be specified by the object data that defines the AR object; and wherein:

the detecting of the fulfillment of the trigger condition occurs within the determined period of time.

A twelfth example provides a method according to any of the first through eleventh examples, wherein:

the trigger condition for executing the conditional modification program specifies a threshold level of ambient audio loudness; and the detecting of the fulfillment of the trigger condition includes receiving an indication that a microphone of the user device detected an actual level of ambient audio loudness that transgresses the threshold level of ambient audio loudness.

A thirteenth example provides a method according to any of the first through twelfth examples; wherein:

the trigger condition for executing the conditional modification program specifies a reference pattern of sounds; and the detecting of the fulfillment of the trigger condition includes receiving an indication that a microphone of the user device captured the reference pattern of sounds.

A fourteenth example provides a method according to any of the first through thirteenth examples, further comprising:

receiving an indication that the user device is editing the AR object; and wherein:

the detecting of the fulfillment of the trigger condition is based on the received indication that the user device is editing the AR object; and the executing of the conditional modification program adds an AR cursor to the second appearance of AR object, the added AR cursor indicating a location of a non-committed edit to the AR object.

A fifteenth example provides a machine-readable medium (e.g., a non-transitory machine-readable storage medium) comprising instructions that, when executed by one or more processors of a machine, cause the machine to perform operations comprising:

providing; to a user device, object data that defines an augmented reality (AR) object, the object data of the AR object specifying a physical geolocation of the AR object, a presentation attribute of the AR object; a conditional modification program of the AR object, and a trigger condition for execution of the conditional modification program, the provided object data causing the user device to present the AR object with a first appearance and located at the physical geolocation;

detecting, by one or more processors of the machine, fulfillment of the trigger condition specified by the object data for execution of the conditional modification program of the AR object;

based on the detected fulfillment of the trigger condition, executing the conditional modification program of the AR object, the executing of the conditional modification program modifying the object data of the AR object by modifying the presentation attribute of the AR object; and providing, to the user device, the modified object data of the AR object, the modified object data causing the user device to present the AR object with a second appearance based on the modified presentation attribute of the AR object.

A sixteenth example provides a machine-readable medium according to the fifteenth example, wherein the operations further comprise:

receiving an indication that the user device submitted an edit to the AR object; and in response to the received indication, incrementing an interaction count that corresponds to the AR object; and wherein:

the detecting of the fulfillment of the trigger condition is based on a comparison of the incremented interaction count to a threshold interaction count.

A seventeenth example provides a machine-readable medium according to the fifteenth example or the sixteenth example, wherein the operations further comprise:

receiving an indication that a device geolocation of the user device intersected the AR object; and in response to the received indication, incrementing an interaction count that corresponds to the AR object; and wherein:

the detecting of the fulfillment of the trigger condition is based on a comparison of the incremented interaction count to a threshold interaction count.

An eighteenth example provides a system comprising:

one or more processors; and a memory storing instructions that, when executed by at least one processor among the one or more processors, cause the system to perform operations comprising:

providing; to a user device, object data that defines an augmented reality (AR) object, the object data of the AR object specifying a physical geolocation of the AR object, a presentation attribute of the AR object; a conditional modification program of the AR object, and a trigger condition for execution of the conditional modification program, the provided object data causing the user device to present the AR object with a first appearance and located at the physical geolocation;

detecting, by one or more processors of the machine, fulfillment of the trigger condition specified by the object data for execution of the conditional modification program of the AR object;

based on the detected fulfillment of the trigger condition, executing the conditional modification program of the AR object, the executing of the conditional modification program modifying the object data of the AR object by modifying the presentation attribute of the AR object; and providing, to the user device, the modified object data of the AR object, the modified object data causing the user device to present the AR object with a second appearance based on the modified presentation attribute of the AR object.

A nineteenth example provides a system according to the eighteenth example, wherein the operations further comprise:

receiving an indication that the user device edited the AR object for a period of time; and in response to the received indication, updating a total interaction time that corresponds to the AR object based on the period of time; and wherein:

the detecting of the fulfillment of the trigger condition is based on a comparison of the updated total interaction time to a threshold total interaction time.

A twentieth example provides a system according to the eighteenth example or the nineteenth example, wherein the operations further comprise:

receiving an indication that the user device edited the AR object; and in response to the received indication; incrementing an interaction count that corresponds to the AR object; and generating a geographical map that includes a depiction of the edited AR object, the depiction having a color that indicates a frequency at which the AR object is edited.

A twenty-first example provides a carrier medium carrying machine-readable instructions for controlling a machine to carry out the operations (e.g., method operations) performed in any one of the previously described examples.

What is claimed is:

1. A method comprising:

providing, to a user device and by one or more processors of a machine, object data that defines an augmented reality (AR) object, the object data of the AR object specifying a physical geolocation of the AR object, a presentation attribute of the AR object, a conditional modification program of the AR object, and a trigger condition for execution of the conditional modification program, the provided object data causing the user device to present the AR object with a first appearance and located at the physical geolocation;

receiving, by one or more processors of the machine, an indication that the user device edited the AR object;

in response to the received indication and by one or more processors of the machine, incrementing an interaction count that corresponds to the AR object;

generating, by one or more processors of the machine, a geographical map that includes a depiction of the edited AR object, the depiction having a color that indicates a frequency at which the AR object is edited;

detecting, by one or more processors of the machine, fulfillment of the trigger condition specified by the object data for execution of the conditional modification program of the AR object;

based on the detected fulfillment of the trigger condition and by one or more processors of the machine; executing the conditional modification program of the AR object, the executing of the conditional modification program modifying the object data of the AR object by modifying the presentation attribute of the AR object; and providing, to the user device and by one or more processors of the machine, the modified object data of the AR object; the modified object data causing the user device to present the AR object with a second appearance based on the modified presentation attribute of the AR object.

2. The method of claim 1, wherein:

the presentation attribute of the AR object specifies a physical dimension of the AR object; and the executing of the conditional modification program modifies the physical dimension of the AR object, the second appearance of the AR object differing in size from the first appearance of the AR object.

3. The method of claim 1, wherein:

the presentation attribute of the AR object specifies a color of at least a portion of the object; and the executing of the conditional modification program modifies the color of the portion of the AR object; the second appearance of the AR object at least partially differing in color from the first appearance of the AR object.

4. The method of claim 1, wherein:

the presentation attribute of the AR object specifies the physical geolocation of the AR object; and the executing of the conditional modification program modifies the physical geolocation of the AR object, the second appearance of the AR object differing in physical geolocation from the first appearance of the AR object.

5. The method of claim 1, wherein:

the detecting of the fulfillment of the trigger condition is based on a comparison of the incremented interaction count to a threshold interaction count.

6. The method of claim 1, further comprising:

receiving an indication that the user device edited the AR object for a period of time; and in response to the received indication, updating a total interaction time that corresponds to the AR object based on the period of time; and wherein:

the detecting of the fulfillment of the trigger condition is based on a comparison of the updated total interaction time to a threshold total interaction time.

7. The method of claim 1, further comprising:

receiving an indication that a device geolocation of the user device intersected the AR object; and in response to the received indication, incrementing an interaction count that corresponds to the AR object; and wherein:

the detecting of the fulfillment of the trigger condition is based on a comparison of the incremented interaction count to a threshold interaction count.

8. The method of claim 1, wherein:

the indication that the user device edited the AR object corresponds to a user profile that specifies a demographic descriptor of a user of the user device;

the interaction count that corresponds to the AR object corresponds to the demographic descriptor; and the detecting of the fulfillment of the trigger condition is based on a comparison of the incremented interaction count to a threshold interaction count.

9. The method of claim 1, further comprising:

providing generated geographical map that includes the depiction of the edited AR object, the depiction having the color that indicates the frequency at which the AR object is edited.

10. The method of claim 1, wherein:

the user device is a first user device; and the method further comprises:

providing the generated geographical map to a second user device, the provided geographical map including the depiction whose color indicates the frequency at which the AR object is edited.

11. The method of claim 1, further comprising:

receiving a user submission that includes the conditional modification program, the trigger condition for execution of the conditional modification program, and a corresponding value accorded to the conditional modification program; and based on the value accorded to the conditional modification program, determining a period of time during which the conditional modification program is to be specified by the object data that defines the AR object, and wherein:

the detecting of the fulfillment of the trigger condition occurs within the determined period of time.

12. The method of claim 1, wherein:

the trigger condition for executing the conditional modification program specifies a threshold level of ambient audio loudness; and the detecting of the fulfillment of the trigger condition includes receiving an indication that a microphone of the user device detected an actual level of ambient audio loudness that transgresses the threshold level of ambient audio loudness.

13. The method of claim 1, wherein:

the trigger condition for executing the conditional modification program specifies a reference pattern of sounds; and the detecting of the fulfillment of the trigger condition includes receiving an indication that a microphone of the user device captured the reference pattern of sounds.

14. The method of claim 1, further comprising:

receiving a further indication that the user device is editing the AR object; and wherein:

the detecting of the fulfillment of the trigger condition is based on the received indication that the user device is editing the AR object; and the executing of the conditional modification program adds an AR cursor to the second appearance of AR object, the added AR cursor indicating a location of a non-committed edit to the AR object.

15. A non-transitory machine-readable storage medium comprising instructions that, when executed by one or more processors of a machine, cause the machine to perform operations comprising:

providing, to a user device; object data that defines an augmented reality (AR) object; the object data of the AR object specifying a physical geolocation of the AR object, a presentation attribute of the AR Object, a conditional modification program of the AR object, and a trigger condition for execution of the conditional modification program, the provided object data causing the user device to present the AR object with a first appearance and located at the physical geolocation;

receiving an indication that the user device edited the AR object;

in response to the received indication, incrementing an interaction count that corresponds to the AR object;

generating a geographical map that includes a depiction of the edited AR Object, the depiction having a color that indicates a frequency at which the AR object is edited;

detecting fulfillment of the trigger condition specified by the object data for execution of the conditional modification program of the AR object;

based on the detected fulfillment of the trigger condition, executing the conditional modification program of the AR object; the executing of the conditional modification program modifying the object data of the AR object by modifying the presentation attribute of the AR object; and providing, to the user device, the modified object data of the AR object, the modified object data causing the user device to present the AR object with a second appearance based on the modified presentation attribute of the AR object.

16. The non-transitory machine-readable storage medium of claim 15, wherein the operations further comprise:

providing generated geographical map that includes the depiction of the edited AR object, the depiction having the color that indicates the frequency at which the AR object is edited.

17. The non-transitory machine-readable storage medium of claim 15, wherein:

the user device is a first user device; and the operations further comprise:

providing the generated geographical map to a second user device, the provided geographical map including the depiction whose color indicates the frequency at which the AR object is edited.

18. A system comprising:

one or more processors; and a memory storing instructions that, when executed by at least one processor among the one or more processors, cause the system to perform operations comprising:

providing, to a user device, object data that defines an augmented reality (AR) object, the object data of the AR object specifying a physical geolocation of the AR object, a presentation attribute of the AR object, a conditional modification program of the AR object, and a trigger condition for execution of the conditional modification program, the provided object data causing the user device to present the AR object with a first appearance and located at the physical geolocation;

receiving an indication that the user device edited the AR object;

in response to the received indication, incrementing an interaction count that corresponds to the AR object;

generating a geographical map that includes a depiction of the edited AR object, the depiction having a color that indicates a frequency at which the AR object is edited;

detecting fulfillment of the trigger condition specified by the object data for execution of the conditional modification program of the AR object;

based on the detected fulfillment of the trigger condition, executing the conditional modification program of the AR object, the executing of the conditional modification program modifying the object data of the AR object by modifying the presentation attribute of the AR object; and providing, to the user device, the modified object data of the AR object, the modified object data causing the user device to present the AR object with a second appearance based on the modified presentation attribute of the AR object.

19. The system of claim 18, wherein the operations further comprise:

providing generated geographical map that includes the depiction of the edited AR object, the depiction having the color that indicates the frequency at which the AR object is edited.

20. The system of claim 18, wherein:

the user device is a first user device; and the operations further comprise:

providing the generated geographical map to a second user device, the provided geographical map including the depiction whose color indicates the frequency at which the AR object is edited.

* * * * *